United States Patent
Yoo et al.

(10) Patent No.: US 11,966,226 B2
(45) Date of Patent: Apr. 23, 2024

(54) DELIVERY ROBOT AND CONTROL METHOD OF THE DELIVERY ROBOT

(71) Applicant: LG ELECTRONICS INC., Seoul (KR)

(72) Inventors: Kyungho Yoo, Seoul (KR); Donghoon Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 379 days.

(21) Appl. No.: 17/545,753

(22) Filed: Dec. 8, 2021

(65) Prior Publication Data
US 2023/0068618 A1    Mar. 2, 2023

(30) Foreign Application Priority Data

Sep. 2, 2021 (KR) .................. 10-2021-0117024
Oct. 8, 2021 (WO) ................ PCT/KR2021/013938

(51) Int. Cl.
| | |
|---|---|
| *G05D 1/02* | (2020.01) |
| *G05D 1/00* | (2006.01) |
| *G06T 7/60* | (2017.01) |
| *G06V 10/25* | (2022.01) |
| *G06V 10/44* | (2022.01) |

(52) U.S. Cl.
CPC ......... *G05D 1/0212* (2013.01); *G05D 1/0238* (2013.01); *G05D 1/0246* (2013.01); *G06T 7/60* (2013.01); *G06V 10/25* (2022.01); *G06V 10/44* (2022.01); *G06T 2207/30242* (2013.01)

(58) Field of Classification Search
CPC .. G05D 1/0212; G05D 1/0238; G05D 1/0246; G05D 1/0223; G05D 1/0214; G06T 7/60; G06T 2207/30242; G06V 10/25; G06V 10/44; G06V 10/70; G06V 20/10
See application file for complete search history.

(56) References Cited

U.S. PATENT DOCUMENTS

| | | | | |
|---|---|---|---|---|
| 11,037,320 | B1* | 6/2021 | Ebrahimi Afrouzi | G06T 7/90 |
| 11,153,503 | B1* | 10/2021 | Ebrahimi Afrouzi | H04N 23/74 |
| 11,589,932 | B2* | 2/2023 | Shelton, IV | A61B 34/37 |
| 2017/0108874 | A1* | 4/2017 | Peters | G05D 1/0246 |
| 2019/0248016 | A1* | 8/2019 | Deyle | B25J 13/006 |
| 2019/0385594 | A1* | 12/2019 | Park | G10L 15/083 |

(Continued)

FOREIGN PATENT DOCUMENTS

| | | |
|---|---|---|
| CN | 110861095 A | 3/2020 |
| KR | 10-2018-0123298 A | 11/2018 |

(Continued)

*Primary Examiner* — Mussa A Shaawat

(74) *Attorney, Agent, or Firm* — Birch, Stewart, Kolasch & Birch, LLP

(57) ABSTRACT

A delivery robot can include an image sensor; a drive par; and a controller configured to detect a revolving door from an image in front of the delivery robot, detect a feature of at least one door blade of a revolving door from the image, generate an entry path including an initial location of the delivery robot and an entry time point for entering into the revolving door, and generate a departure path including a departure time point and a departure point for exiting from the revolving door, and control the drive part to move the delivery robot along the entry path and the departure path to pass through the revolving door.

20 Claims, 15 Drawing Sheets

(56) References Cited

U.S. PATENT DOCUMENTS

| | | | |
|---|---|---|---|
| 2020/0023765 A1* | 1/2020 | Lee | G06Q 10/0838 |
| 2020/0035249 A1* | 1/2020 | Choi | G10L 17/24 |
| 2020/0084382 A1* | 3/2020 | Furukawa | G03B 5/00 |
| 2021/0047659 A1* | 2/2021 | Brangwynne | C07K 14/47 |
| 2021/0097852 A1* | 4/2021 | Yoo | G08G 1/005 |
| 2021/0102817 A1* | 4/2021 | Kim | G01C 21/3407 |
| 2021/0114225 A1* | 4/2021 | Fukunaga | B25J 9/1664 |
| 2022/0019213 A1* | 1/2022 | Haghighat Kashani | G05D 1/0231 |
| 2022/0032857 A1* | 2/2022 | White | B60R 11/0235 |

FOREIGN PATENT DOCUMENTS

| | | |
|---|---|---|
| KR | 10-2021-0013898 A | 2/2021 |
| KR | 10-2021-0055342 A | 5/2021 |

\* cited by examiner

FIG. 11
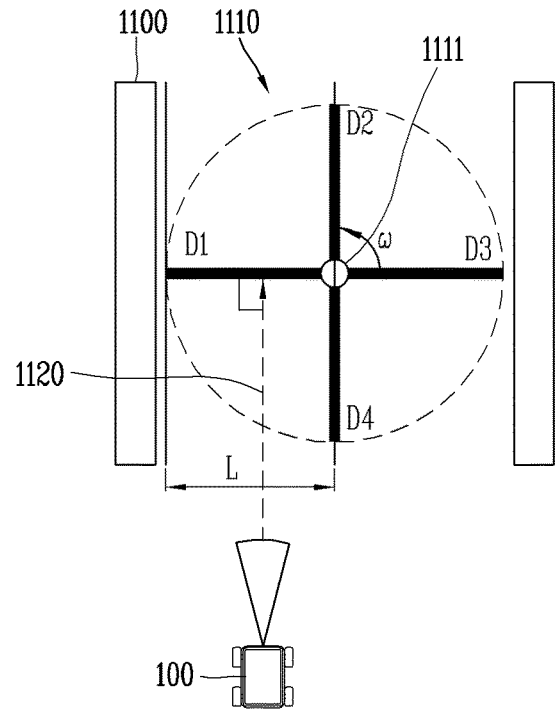
(a)
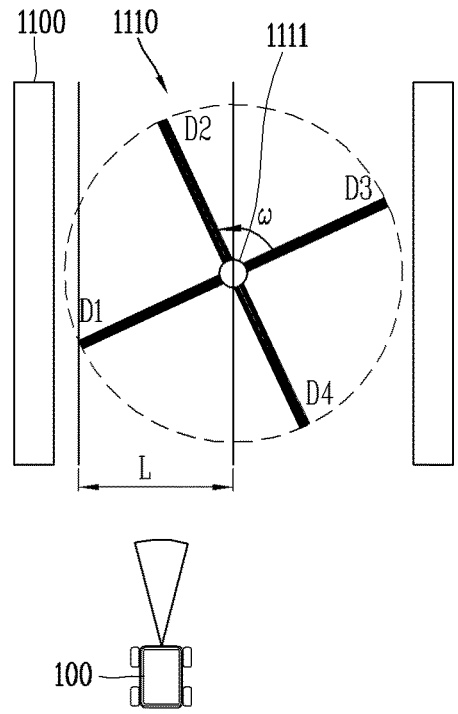
(b)
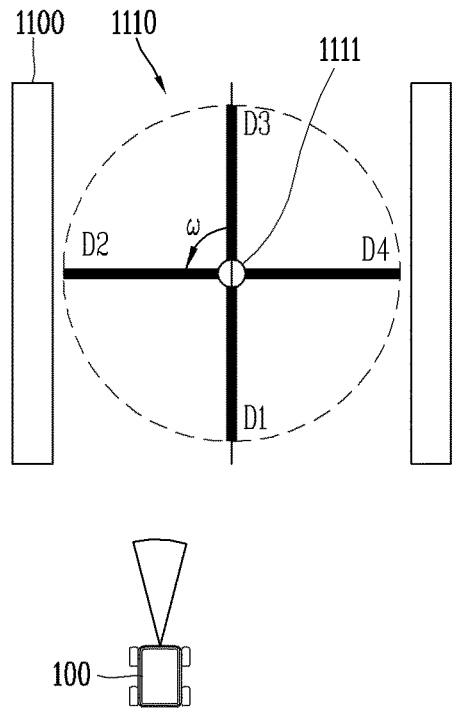
(d)
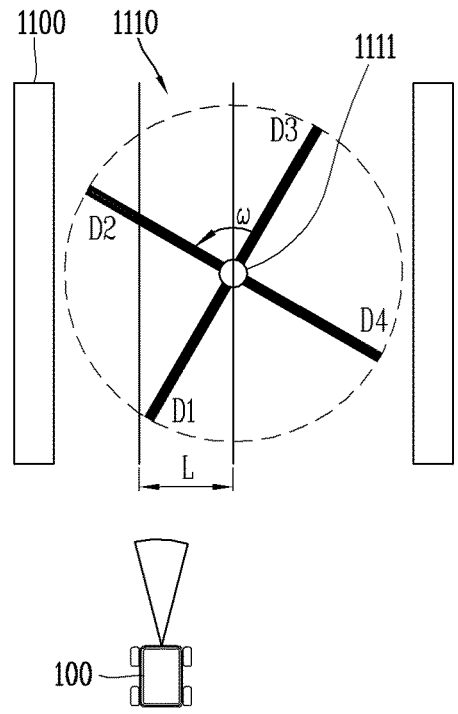
(c)

FIG. 13
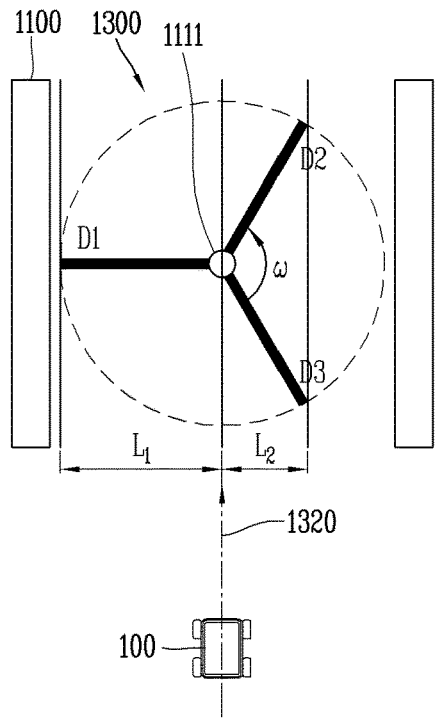
(a)
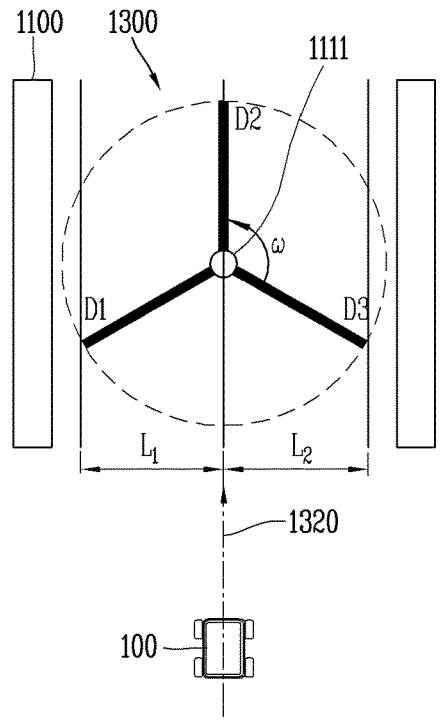
(b)
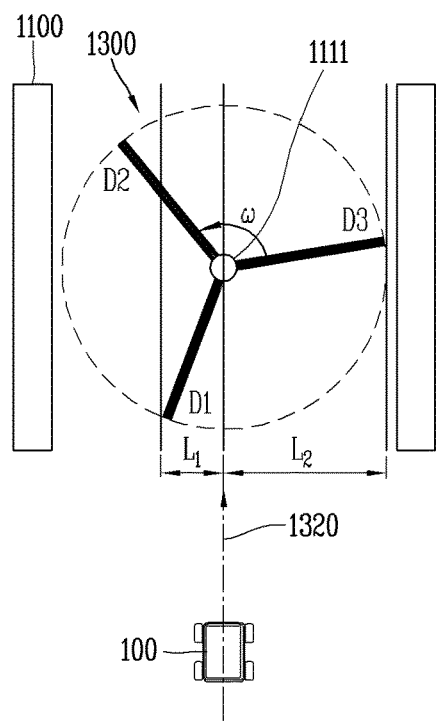
(c)

FIG. 14
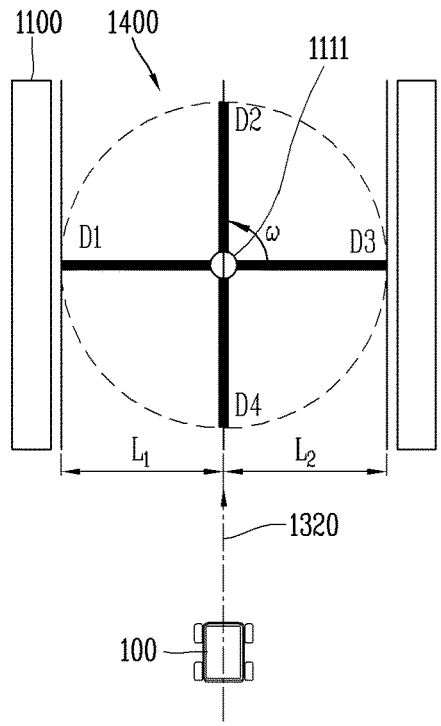
(a)
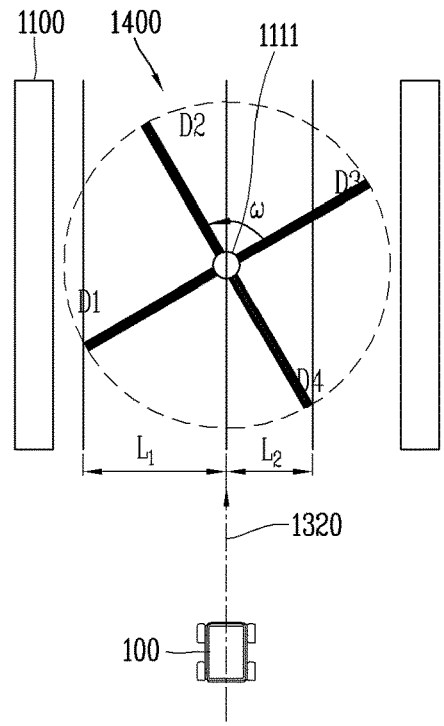
(b)
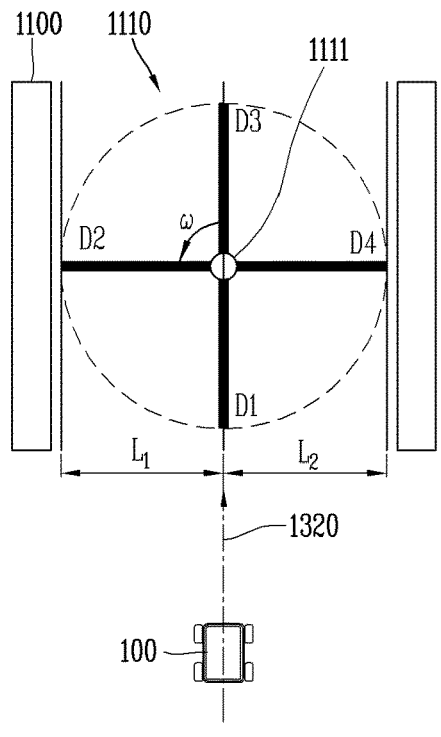
(d)
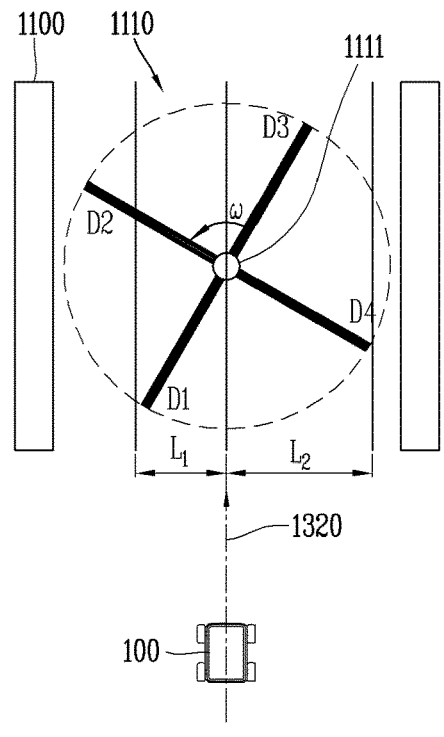
(c)

FIG. 15
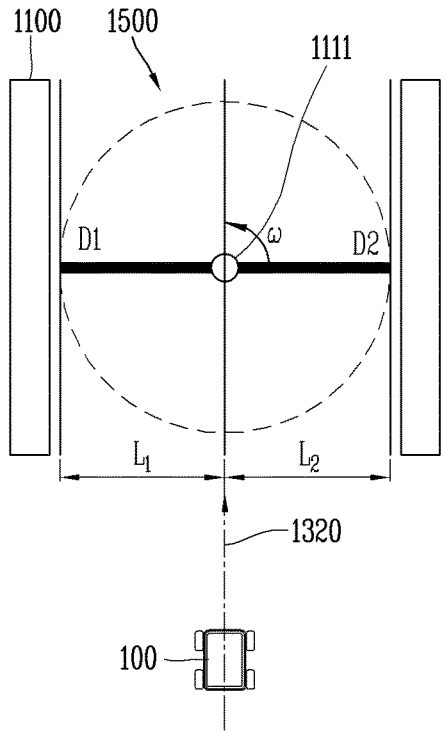
(a)
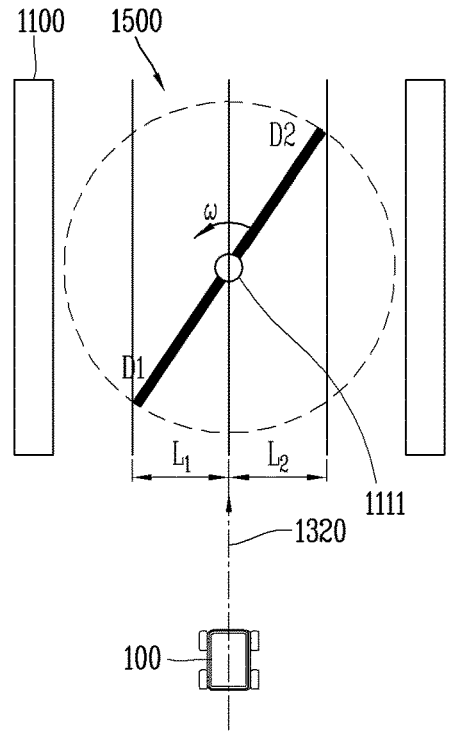
(b)
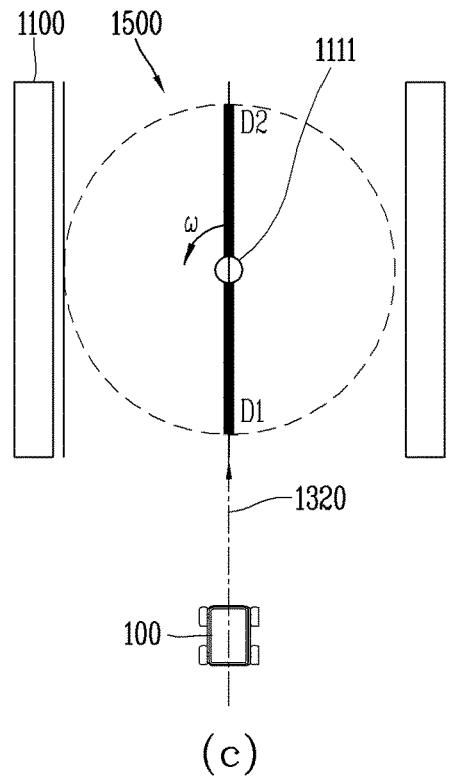
(c)

FIG. 16
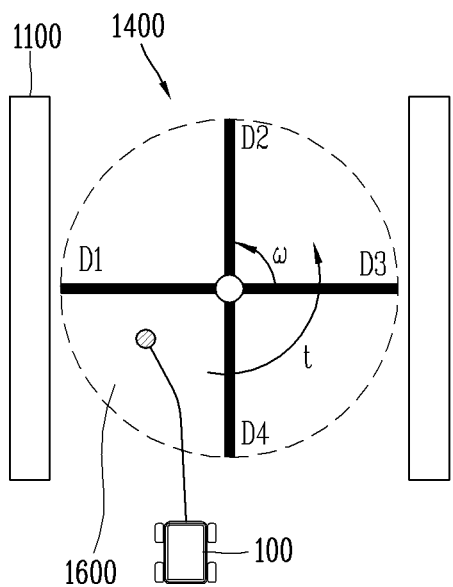
(a)
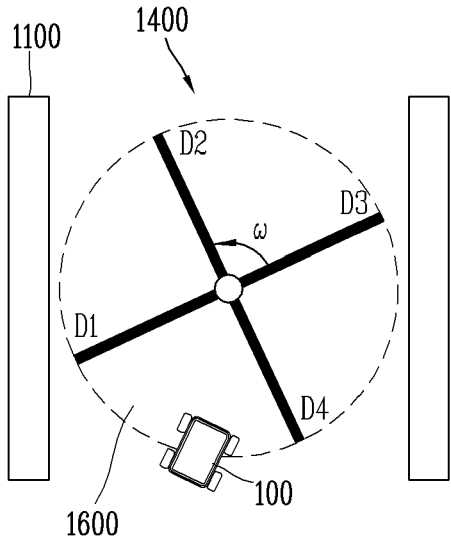
(b)
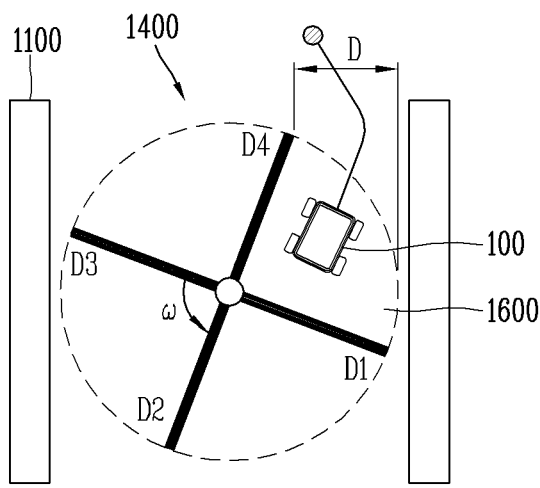
(d)
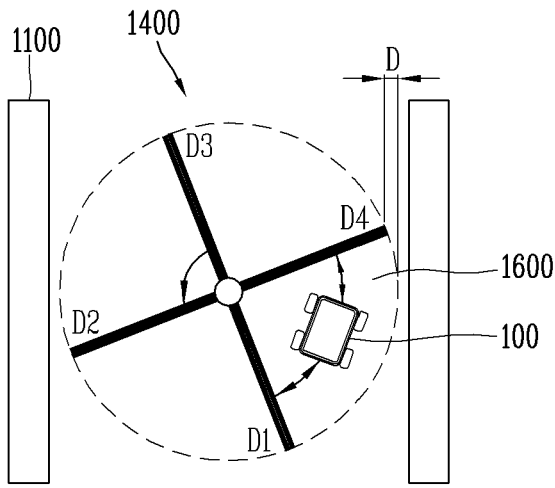
(c)

DELIVERY ROBOT AND CONTROL METHOD OF THE DELIVERY ROBOT

CROSS-REFERENCE TO RELATED APPLICATIONS

Pursuant to 35 U.S.C. § 119(a), this application claims priority to Korean Application No. 10-2021-0117024, filed on Sep. 2, 2021 in the Republic of Korea, and International Patent Application No. PCT/KR2021/013938, filed on Oct. 8, 2021, the contents of all these applications are incorporated by reference herein in their entirety into the present application.

BACKGROUND

1. Technical Field

The present disclosure relates to a delivery robot that delivers products to a customer through autonomous driving.

2. Description of the Related Art

A robot may be a machine that automatically processes or operates a task given by its own capabilities. In particular, a robot having a function of recognizing an environment and performing an operation based on self-determination may be referred to as an intelligent robot, and various services may be provided using the intelligent robot.

Such an intelligent robot may operate according to the recognized environment and its own determination, thereby greatly increasing the convenience of a user who uses the robot. Furthermore, as a part of the effort to a service provided through the intelligent robot, a delivery service that delivers products purchased online or the like by a customer in a last mile section is being considered.

The last mile section refers to a last section of logistics delivery in which products are delivered directly to a customer, which is a section with the highest labor intensity among each section of the logistics delivery. Therefore, there is an advantage that efficiency can be greatly increased when a robot is used instead of manpower for the delivery of the last mile section. Accordingly, for the delivery service in the last mile section using the robot, a need for an autonomous driving function that allows a robot to recognize a surrounding environment and autonomously drive according to the recognized surrounding environment comes to the fore.

On the other hand, a customer is usually located inside a building. Accordingly, a delivery in the last mile section includes a process of entering the building and exiting the building. Therefore, in order to provide a delivery service in the last mile section using a robot (hereinafter, a delivery robot), the autonomous driving function should allow the delivery robot to enter the building and exit the building.

On the other hand, in the case of a building or the like, an automatic door that automatically opens and closes is installed in order to maintain a cooling or heating temperature, or to prevent foreign substances from entering the building. Among these automatic doors, in the case of a flat type automatic door (flat automatic door), it senses whether a person or the like is located at a preset sensing location, and operates to be open automatically according to the sensing result. Therefore, in the case of such a flat automatic door, the delivery robot may move to the sensing location to open the automatic door.

However, the automatic door may be a revolving type door in which two to four doors rotate at a constant speed about a central rotation shaft. In the case of such a revolving door, since a preset sensing location does not exist, there is a problem in that it is impossible to pass through the revolving door in a method of driving the automatic door using the sensing location.

Moreover, due to the characteristics of the revolving door, an accident may occur that the delivery robot collides with at least one of doors of the revolving door or gets caught between a door and an outer wall of the revolving door when entering without knowing a rotational speed of the revolving door. Accordingly, when the rotational speed of the revolving door is not known in advance or information such as the rotational speed is not obtained in advance through communication with the revolving door, there is a problem in that it is difficult for the delivery robot to pass through the revolving door.

As a method for solving this problem, a method for allowing the delivery robot to receive information on the revolving door through a communication connection between a communication device provided in the automatic door (revolving door) and a communication device of the delivery robot comes to the fore. However, the foregoing method has a problem in that the revolving door must include a communication device for communication with the delivery robot.

Furthermore, even when the revolving door has a communication device, a communication protocol required for communication between the revolving door and the delivery robot may be different depending on the manufacturer of the revolving door. Therefore, in order for the delivery robot to pass through various revolving doors, since the communication device of the delivery robot needs to be developed to enable communication according to different communication protocols for each manufacturer, there is a problem in that it is very difficult to develop and implement the communication device of the delivery robot.

Accordingly, a need for an autonomous driving function of the delivery robot that allows the delivery robot to freely pass through the revolving door without a communication connection between the delivery robot and the automatic door comes to the fore.

SUMMARY OF THE DISCLOSURE

The present disclosure is contrived to solve the foregoing and other problems, and an aspect of the present disclosure is to allow a delivery robot to pass through a revolving door with no communication connection between the delivery robot and the automatic door, only by using a sensor of the delivery robot to sense a feature of the revolving door, and allow the delivery robot to drive according to the sensed feature of the revolving door.

Another aspect of the present disclosure is to allow the delivery robot to safely pass through the revolving door without being caught by the revolving door that is automatically rotating.

In order to achieve the foregoing and other objectives, according to an aspect of the present disclosure, a delivery robot according to an embodiment of the present disclosure may include a sensing unit including at least one image sensor, a drive unit that moves a main body of the delivery robot, and a controller that detects a revolving door from an image in front of the delivery robot acquired from the at least one sensor, detects a feature of at least one door blade rotating about a rotation shaft from the detected image of the revolving door, detects a feature of the revolving door including a rotational speed of the revolving door, a size of a region inside the revolving door, and a number of the door blades from the detected feature of the at least one door blade, generates an entry path including an initial location of the delivery robot and an entry time point into the revolving door, and a departure path including a departure time point and a departure point from the revolving door based on the detected feature of the revolving door, and controls the drive unit such that the delivery robot drives along the entry path and the departure path to pass through the revolving door.

According to an embodiment, the controller may identify any one of the door blades of the revolving door that is distinguishable from other door blades, and detect the rotational speed of the revolving door and the number of door blades provided in the revolving door based on a pattern in which a distance on the image between an edge of the identified any one door blade and the rotation shaft changes.

According to an embodiment, the controller may detect static features of each door blade calculated based on a width of the each door blade calculated according to a distance on the image having a maximum value when the distance on the image between an edge of the each door blade and the rotation shaft has the maximum value, and a shape of the each door blade, and identify any one of the door blades based on the detected static features.

According to an embodiment, the controller may calculate a time period in which the revolving door rotates once based on a time difference between a first time point corresponding to a feature of the identifiable any one door blade and a second time point at which the feature of the identifiable any one door blade is detected again after the first time point, and calculate a rotational speed of the revolving door and a number of door blades of the revolving door based on the time period in which the revolving door rotates once and a distance on the image between an edge of the identifiable any one door blade and the rotation shaft.

According to an embodiment, the controller may calculate a size of an inner region of the revolving door based on the distance on the image between the edge of the identifiable any one door blade and the rotation shaft, and calculate a size of an entry space for allowing the delivery robot to enter into the revolving door region based on the calculated size of the inner region of the revolving door and the number of door blades of the revolving door.

According to an embodiment, the delivery robot may further include a storage unit including information on a time period required for the revolving door to rotate by a preset angle based on an angular speed for each number of revolutions per minute of the revolving door, in which the controller calculates a time difference between a time point at which the distance on the image between the edge of the door blade at either one of left and right sides of the rotation shaft has a maximum value and a time point at which the distance thereof has a minimum value, and calculates a number of revolutions per minute of the revolving door based on information on the calculated time difference and the required time period, and calculates estimated required time periods to be required for each one rotation of revolving doors having different door blades according to a number of times a change pattern of the distance on the image between the edge of the door blade and the rotation shaft is repeated at either one of the left and right sides of the rotation shaft, and estimates a number of door blades of the revolving door based on any one corresponding to a time period required for one rotation of the revolving door calculated based on the number of revolutions per minute, among the estimated required time periods.

According to an embodiment, the controller may detect a first distance between an edge of a door blade at a left side of the rotation shaft and the rotation shaft, and a second distance between an edge of a door blade at a right side of the rotation shaft and the rotation shaft about the rotation shaft of the revolving door, and determine whether the revolving door has three door blades according to whether the first and second distances have a maximum value at a time point at which the detected first and second distances become the same, and determine that the number of door blades of the revolving door is two or four based on a change pattern of the first and second distances when it is determined that the revolving door does not have three door blades.

According to an embodiment, the controller may determine whether the first and second distances have a maximum value based on whether the first and second distances have a value above a preset ratio with respect to a maximum value of each of the first and second distances at the time point at which the detected first and second distances become the same.

According to an embodiment, the controller may determine that the number of door blades of the revolving door is two or four based on whether it occurs a case where both the first and second distances have a value close to zero, or a case where both the first and second distances are not detected when it is determined that the revolving door does not have three door blades.

According to an embodiment, the controller may extract a partial region as a region of interest from image information acquired from the at least one image sensor based on an angle directed by the image sensor and distance information included in the image information, and detect whether there is the revolving door from the extracted region of interest.

According to an embodiment, the controller may determine any one space divided by each door blade of the revolving door as an entry space for the delivery robot to enter, and detect a location of the entry space according to the rotational speed of the revolving door, and generate the entry path for the delivery robot to enter into the entry space according to the detected location of the entry space.

According to an embodiment, the controller may calculate a time period in which the location of the entry space is changed by above a preset angle according to the rotational speed of the revolving door, and generate the departure path based on the calculated time period.

According to an embodiment, the controller may determine an entry speed according to a time period until the entry space moves to a preset entry location according to the rotational speed of the revolving door and a distance between the revolving door and the delivery robot.

According to an embodiment, the preset entry location may be a location at which a center point of the entry space corresponds to a center point of an entrance of the revolving door.

According to an embodiment, the controller may detect separation distances between door blades around the delivery robot and an outer wall surrounding the revolving door, and the delivery robot, and control the drive unit to drive the delivery robot based on the detected separation distances and the rotational speed of the revolving door when the delivery robot drives in a region inside the revolving door.

According to an embodiment, the controller may define a departure point at a point symmetrical to the initial location of the delivery robot at which the delivery robot starts to enter into the revolving door about the rotation shaft.

According to an embodiment, the controller may continuously update a location of the delivery robot when driving in an inner region of the revolving door, and generate the departure path connecting the departure point and the updated location of the delivery robot when the updated location of the delivery robot and the departure point are close to within a preset range, and control the drive unit to drive along the departure path based on whether the departure path collides with the rotating door blade.

According to an embodiment, the controller may detect a distance between an edge of the door blade in front of the delivery robot and the outer wall surrounding the revolving door, and determine whether to collide with the door blade when driving along the departure path according to whether the detected distance is above a preset distance.

According to an embodiment, the preset distance may be determined according to a size of the delivery robot.

In order to achieve the foregoing and other objectives, according to an aspect of the present disclosure, a method of controlling a delivery robot may include detecting a revolving door located in front of the delivery robot based on at least one image acquired through at least one image sensor, detecting a feature of at least one door blade that rotates about a rotation shaft from the detected image of the revolving door, detecting a feature of the revolving door including a rotational speed of the revolving door, a size of a region inside the revolving door, and a number of the door blades based on the detected feature of the door blade, generating an entry path including an initial location of the delivery robot and an entry point into the revolving door from the detected feature of the revolving door, and controlling a drive unit of the delivery robot to drive along the generated entry path, controlling the drive unit to drive in an inner region of the revolving door according to the rotational speed of the revolving door and the movement of the rotating door blades when entering into the region inside the revolving door, determining a departure point located at an exit of the revolving door based on the initial location of the delivery robot, and generating a departure path based on the departure point and the location of the delivery robot, and controlling the drive unit to drive along the departure path based on the departure path and the door blades around the delivery robot.

The effects of a delivery robot and a control method of the delivery robot according to the present disclosure will be described as follows.

According to at least one of embodiments of the present disclosure, the present disclosure may detect a feature of a revolving door according to a rotational state of the revolving door, and calculate a size of an entry space and a rotational speed of the revolving door according to the detected feature of the revolving door. Furthermore, the delivery robot may be allowed to enter and leave a region where the revolving door rotates according to the calculated size and rotational speed of the entry space, thereby having an effect of allowing the delivery robot to pass through the revolving door only as a result of sensing a surrounding environment with no communication connection with the revolving door.

In addition, the present disclosure may allow the robot that has entered the entry space to drive according to the rotational speed of the revolving door, thereby having an effect of allowing the delivery robot to pass through the revolving door with no caught-in accident or collision accident due to the revolving door.

BRIEF DESCRIPTION OF THE DRAWINGS

FIG. 11 is an example view illustrating an example of detecting a feature of at least one rotating door from an image of a revolving door acquired from an entrance portion of the revolving door according to an embodiment of the present disclosure.

FIGS. 13 to 15 are example views for explaining features of door blades that differ from one another according to the number of the door blades of the revolving door according to an embodiment of the present disclosure.

FIG. 16 is an example view illustrating an example in which a delivery robot enters a revolving door region and leaves the revolving door region based on a calculated entry space and a rotational speed of the revolving door according to an embodiment of the present disclosure.

DETAILED DESCRIPTION OF THE EMBODIMENTS

Figure 1:
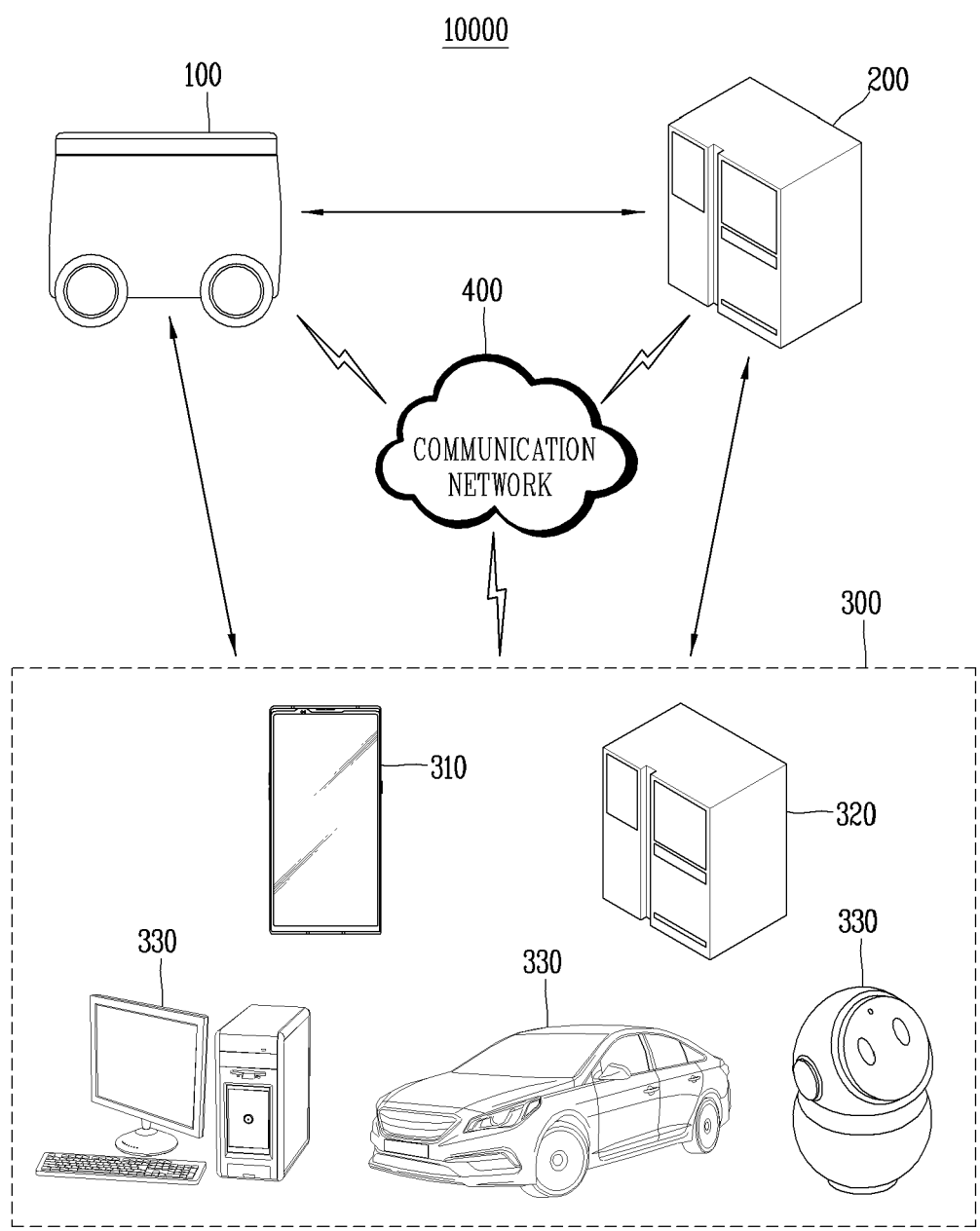
FIG. 1 is a block diagram of a delivery system according to an embodiment of the present disclosure.

Hereinafter, the embodiments disclosed in the present disclosure will be described in detail with reference to the accompanying drawings, and the same or similar elements are designated with the same numeral references regardless of the numerals in the drawings and their redundant description will be omitted. In describing the embodiments disclosed herein, moreover, the detailed description will be omitted when specific description for publicly known technologies to which the invention pertains is judged to obscure the gist of the present disclosure.

As illustrated in FIG. 1, the delivery system 10000 includes a delivery robot 100 that autonomously drives in a driving region, and a control server 200 communicably connected to the delivery robot 100 through a communication network 400 to control the operation of the delivery robot 100. Furthermore, the delivery system 10000 may further include one or more communication devices 300 communicatively connected to at least one of the delivery robot 100 and the control server 200 to transmit and receive information to and from at least one of the delivery robot 100 and the control server 200.

The delivery robot 100 may be an intelligent robot that automatically processes or operates a task given by its own capabilities. For example, the intelligent robot may be an automated guided vehicle (AGV), which is a transportation device that moves by a sensor on the floor, a magnetic field, a vision device, and the like, or a guide robot that provides guide information to a user in an airport, a shopping mall, a hotel, or the like.

The delivery robot 100 may be provided with a drive unit including an actuator or a motor to perform various physical operations such as moving a robot joint (e.g., an electric motor or a combustion engine). For instance, the delivery robot 100 may autonomously drive in the driving region. The autonomous driving refers to a self-driving technology, and the delivery robot 100 may be an autonomous driving vehicle (robot) that is driven without a user's manipulation or with a user's minimal manipulation. A technology for maintaining a driving lane, a technology for automatically adjusting speed such as adaptive cruise control, a technology for automatically driving along a predetermined path, a technology for automatically setting a path when a destination is set, and the like may be all included in the autonomous driving.

In order to perform such autonomous driving, the delivery robot 100 may be a robot to which artificial intelligence (AI) and/or machine learning is applied. The delivery robot 100 may autonomously drive in the driving region to perform various operations through the artificial intelligence and/or machine learning. For instance, an operation according to a command designated from the control server 200 may be performed, or a self-search/monitoring operation may be performed.

A detailed description of artificial intelligence and/or machine learning technology applied to the delivery robot 100 is as follows.

Artificial intelligence (AI) refers to a field of studying artificial intelligence or a methodology capable of creating artificial intelligence, and machine learning refers to a field of studying a methodology for defining various problems dealt with in the field of artificial intelligence and solves them. The machine learning technology is a technology that collects and learns a large amount of information based on at least one algorithm, and determines and predicts information based on the learned information. The learning of information refers to an operation of recognizing the features of information, rules and determination criteria, quantifying a relation between information and information, and predicting new data using the quantified patterns. Machine learning is also defined as an algorithm that improves the performance of a certain task through continuous experience in the task.

Algorithms used by the machine learning technology may be algorithms based on statistics, for example, a decision tree that uses a tree structure type as a prediction model, an artificial neural network that mimics neural network structures and functions of living creatures, genetic programming based on biological evolutionary algorithms, clustering of distributing observed examples to a subset of clusters, a Monte Carlo method of computing function values as probability using randomly-extracted random numbers, and the like. As one field of the machine learning technology, there is a deep learning technology of performing at least one of learning, determining, and processing information using the artificial neural network algorithm.

An artificial neural network (ANN) as a model used in machine learning may refer to all of models having a problem-solving ability, which are composed of artificial neurons (nodes) that form a network by synaptic connections. The artificial neural network may have a structure of connecting between layers and transferring data between the layers. The deep learning technology may be employed to learn a vast amount of information through the artificial neural network using a graphic processing unit (GPU) optimized for parallel computing.

The artificial neural network may be defined by a connection pattern between neurons in different layers, a learning process of updating model parameters, and an activation function of generating an output value. The artificial neural network may include an input layer, an output layer, and optionally one or more hidden layers. Each layer may include one or more neurons, and the artificial neural network may include a synapse that connects neurons to neurons. In the artificial neural network, each neuron may output a function value of an activation function for input signals being input through the synapse, a weight, a bias, and the like. The model parameters refer to parameters determined through learning, and include a weight of a synaptic connection, a bias of a neuron, and the like. In addition, a hyperparameter refers to a parameter that must be set prior to learning in a machine learning algorithm, and includes a learning rate, a repetition number, a mini-batch size, an initialization function, and the like.

The purpose of learning in an artificial neural network can be seen as determining the model parameters that minimize a loss function. The loss function may be used as an index for determining an optimal model parameter in the learning process of the artificial neural network.

Machine learning can be classified into supervised learning, unsupervised learning, and reinforcement learning according to a learning method.

The supervised learning may refer to a method of training an artificial neural network in a state where a label for learning data is given, and the label may refer to a correct answer (or result value) that the artificial neural network must infer when learning data is input to the artificial neural network. The unsupervised learning may refer to a method of training an artificial neural network in a state where no label is given for learning data. The reinforcement learning may refer to a learning method of training an agent defined in a certain environment to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. Hereinafter, machine learning is used in a sense including deep learning.

The delivery robot 100 may be implemented in a form to which such artificial intelligence and/or machine learning technology is not applied, but in the following, a form in which the artificial intelligence and/or machine learning technology is applied to the delivery robot will be mainly described.

The driving region in which the delivery robot 100 operates may be indoors or outdoors. The delivery robot 100 may operate in a zone partitioned by walls or pillars. In this case, the operation zone of the delivery robot 100 may be set in various ways according to a design purpose, task properties of the robot, mobility of the robot, and various other factors. Furthermore, the delivery robot 100 may operate in an open zone that is not predefined. In addition, the delivery robot 100 may sense a surrounding environment to determine an operation zone by itself. The operation may be made through artificial intelligence and/or machine learning technology applied to the delivery robot 100.

The delivery robot 100 and the control server 200 may be communicatively connected through the communication network 400 to transmit and receive data to and from each other. Furthermore, the delivery robot 100 and the control server 200 respectively may transmit and receive data to and from the communication device 300 through the communication network 400. Here, the communication network 400 may refer to a communication network that provides a communication environment for communication devices in a wired or wireless manner. For instance, the communication network 400 may be an LTE/5G network. In other words, the delivery robot 100 may transmit and receive data to and from the control server 200 and/or the communication device 300 through an LTE/5G network 500. In this case, the delivery robot 100 and the control server 200 may communicate through a base station connected to the communication network 400 or directly communicate without passing through the base station. In addition, in addition to the LTE/5G network, other mobile communication technology standards or communication methods may be applied to the communication network 400. For instance, the other mobile communication technology standards or communication methods may include at least one of Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), and the like.

The communication network 400 may include a connection of network elements such as hubs, bridges, routers, switches and gateways. The communication network 400 may include one or more connected networks, for instance, a multi-network environment, including a public network such as the Internet and a private network such as a secure enterprise private network. Access to the communication network 400 may be provided through one or more wired or wireless access networks. Furthermore, the communication network 400 may support various types of M2M communications (Internet of Things (IoT), Internet of Everything (IoE) and Internet of Small Things (IoST) that exchanges and processes information between distributed components such as things.

The delivery robot 100 may perform an operation in the driving region, and may provide information or data related to the operation to the control server 200 through the communication network 400. For instance, the delivery robot 100 may provide the location of the delivery robot 100 and information on the operation being performed to the control server 200. In addition, the delivery robot 100 may receive information or data related to the operation from the control server 200 through the communication network 400. For instance, the control server 200 may provide information on the driving motion control of the delivery robot 100 to the delivery robot 100.

The delivery robot 100 may provide its own status information or data to the control server 200 through the communication network 400. Here, the status information may include information on the location, battery level, durability of parts, replacement cycle of consumables, and the like of the delivery robot 100. Accordingly, the control server 200 may control the delivery robot 100 based on the information provided from the delivery robot 100.

Meanwhile, the delivery robot 100 may provide one or more communication services through the communication network 400, and may also provide one or more communication platforms through the communication services. For instance, the delivery robot 100 communicates with a communication target using at least one service of Enhanced Mobile Broadband (eMBB), Ultra-reliable and low latency communications (URLLC), and Massive Machine-type communications (mMTC).

The Enhanced Mobile Broadband (eMBB) is a mobile broadband service, through which multimedia content, wireless data access, and the like may be provided. In addition, more advanced mobile services such as a hot spot and wideband coverage for receiving explosively increasing mobile traffic may be provided through the eMBB. Large traffic may be received in an area with low mobility and high density of users through a hot spot. A wide and stable wireless environment and user mobility may be secured through wideband coverage.

The Ultra-reliable and low latency communications (URLLC) service defines much more stringent requirements than the existing LTE in terms of data transmission/reception reliability and transmission delay, and includes 5G services for production process automation at industrial sites, telemedicine, telesurgery, transportation, safety, and the like.

The Massive Machine-type communications (mMTC) is a service that is not sensitive to transmission delay requiring a relatively small amount of data transmission. A much larger number of terminals general mobile phones, such as sensors may simultaneously access a wireless access network by the mMTC. In this case, the communication module of the terminal should be inexpensive, and improved power efficiency and power saving technology are required to allow operation for several years without battery replacement or recharging.

The communication service may further include all services that can be provided to the communication network 400 in addition to the eMBB, the URLLC, and the mMTC described above.

The control server 200 may be a server device that centrally controls the delivery system 10000. The control server 200 may control the driving and operation of the delivery robot 100 in the delivery system 10000. The control server 200 may be provided in the driving region to communicate with the delivery robot 100 through the communication network 400. For instance, the control server 200 may be provided in any one of buildings corresponding to the driving region. The control server 200 may also be provided in a place different from the driving region to control the operation of the delivery system 10000. The control server 200 may be implemented as a single server, but may also be implemented as a plurality of server sets, cloud servers, or a combination thereof.

The control server 200 may perform various analyses based on information or data provided from the delivery robot 100, and may control an overall operation of the delivery robot 100 based on the analysis result. The control server 200 may directly control the driving of the delivery robot 100 based on the analysis result. Furthermore, the control server 200 may derive useful information or data from the analysis result and output the derived information or data. Furthermore, the control server 200 may adjust parameters related to the operation of the delivery system 10000 using the derived information or data.

At least one of the delivery robot 100 and the control server 200 communicatively connected through the communication network 400 may be communicably connected to the communication device 300 through the communication network 400. In other words, the delivery robot 100 and the control server 200 may communicate with a device that can be communicably connected to the communication network 400 among the communication devices 300 through the communication network 400. At least one of the delivery robot 100 and the control server 200 may also communicably connected to the communication device 300 through a communication method other than the communication network 400. In other words, at least one of the delivery robot 100 and the control server 200 may communicably connected to a device that can be communicably connected in a manner different from that of the communication network 400 among the communication devices 300.

For example, at least one of the delivery robot 100 and the control server 200 may be communicably connected to the communication device 300 using at least one method of Wireless LAN (WLAN), Wireless Personal Area Network (WPAN), Wireless-Fidelity (Wi-Fi), Wireless Fidelity (Wi-Fi) Direct, Digital Living Network Alliance (DLNA), Wireless Broadband (WiBro), World Interoperability for Microwave Access (WiMAX), Zigbee, Z-wave, Blue-Tooth, Radio Frequency Identification (RFID), Infrared Data Association (IrDA), Ultrawide-Band (UWB), Wireless Universal Serial Bus (USB), Near Field Communication (NFC), Visible Light Communication, Light Fidelity (Li-Fi), and satellite communication. In addition, communication may be connected in a communication method other than the above communication methods.

The communication device 300 may refer to any device and/or server capable of communicating with at least one of the delivery robot 100 and the control server 200 through various communication methods including the communication network 400. For instance, the communication device 300 may include at least one of a mobile terminal 310, an information providing system 320, and an electronic device 330.

The mobile terminal 310 may be a communication terminal capable of communicating with the delivery robot 100 and the control server 200 through the communication network 400. The mobile terminal 310 may include a mobile device such as a mobile phone, a smart phone, a wearable device, for example, a watch type terminal (smartwatch), a glass type terminal (smart glass), a head mounted display (HMD), a laptop computer, a digital broadcasting terminal, a personal digital assistant (PDA), a portable multimedia player (PMP), a navigation device, a slate PC, a tablet PC, an ultrabook, and the like.

The information providing system 320 may refer to a system that stores and provides at least one of information reflected in the driving region or related to the driving region, and information related to the operation of the delivery system 10000. The information providing system 320 may be a system (server) that is operable in connection with the delivery robot 100 and the control server 200 to provide data and services to the delivery robot 100 and the control server 200.

The information providing system 320 may include at least one of all systems (servers) capable of being communicably connected to and exchanging information with the delivery robot 100 and the control server 200. For instance, at least one of a database system, a service system, and a central control system may be included in the information providing system 320. A specific example of the information providing system 320 may include at least one of a service system of a manufacturer of the delivery robot 100, a service system of a manufacturer of the control server 200, a central (management) control system of a building corresponding to the driving region, a service system of a supplier that supplies energy to a building corresponding to the driving region, an information system of a construction company of a building corresponding to the driving region, a service system of a manufacturer of the mobile terminal 200, a service system of a communication company that provides a communication service through the communication network 400, and a service system of a developer of an application applied to the delivery system 10000. In addition, the information providing system 320 may further include all systems operable in connection with the delivery system 10000 in addition to the above systems.

The information providing system 320 provides various services/information to electronic devices including the delivery robot 100, the control server 200, the mobile terminal 310, and the electronic device 330. The information providing system 320 may be implemented in a cloud to include a plurality of servers, and may perform calculations related to artificial intelligence that are difficult or time-consuming for the delivery robot 100, the mobile terminal 310, and the like to generate a model related to artificial intelligence, and provided related information to the delivery robot 100, the mobile terminal 310, and the like.

The electronic device 330 may be a communication device capable of communicating with at least one of the delivery robot 100 and the control server 200 through various communication methods including the communication network 400 in the driving region. For instance, the electronic device 330 may be at least one of a personal computer, a home appliance, a wall pad, a control device that controls facilities/equipment such as an air conditioner, an elevator, an escalator, and lighting, a watt-hour meter, an energy control device, an autonomous vehicle, and a home robot. The electronic device 330 may be connected to at least one of the delivery robot 100, the control server 200, the mobile terminal 310, and the information providing system 320 in a wired or wireless manner.

The communication device 300 may share the role of the control server 200. For instance, the communication device 300 may acquire information or data from the delivery robot 100 to provide the acquired information or data to the control server 200, or acquire information or data from the control server 200 to provide the acquired information or data to the delivery robot 100. In addition, the communication device 300 may be in charge of at least part of an analysis to be performed by the control server 200, and may provide the analysis result to the control server 200. Furthermore, the communication device 300 may receive the analysis result, information or data from the control server 200 to simply output it. In addition, the communication device 300 may replace the role of the control server 200.

In the delivery system 10000 as described above, the delivery robot 100 may drive in the driving region as shown in FIGS. 2A to 4.

Figure 2A:
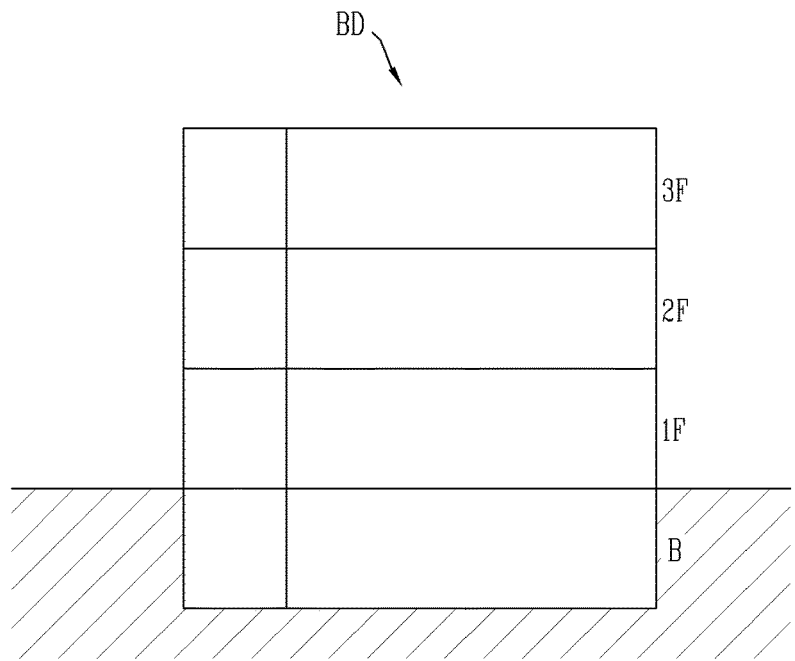
FIG. 2A is an example view 1-*a* showing an example of a driving region according to an embodiment of the present disclosure.
Figure 2B:
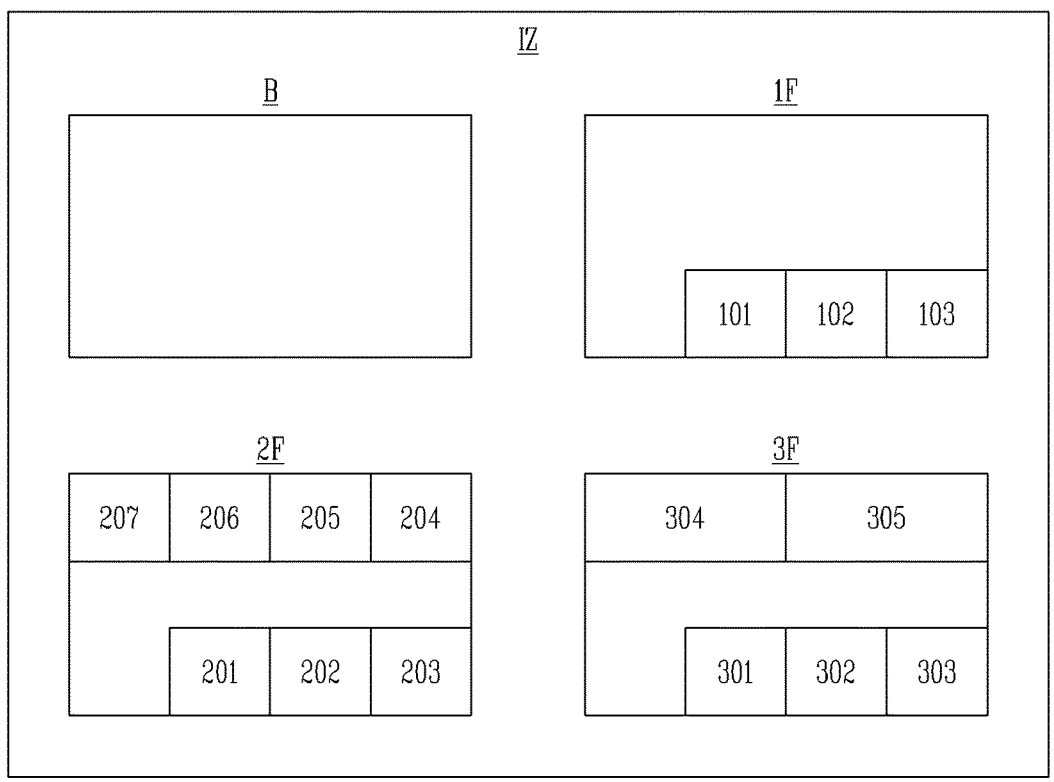
FIG. 2B is an example view 1-*b* showing an example of a driving region according to an embodiment of the present disclosure.

The driving region may include at least a portion of an indoor zone IZ in a building BD with one or more floors, as shown in FIGS. 2A and 2B. In other words, the delivery robot 100 may drive in at least a portion of the indoor zone IZ in a building with one or more floors. For instance, first and second floors in a building consisting of a basement and first to third floors may be included in the driving region, thereby allowing the delivery robot 100 to drive on each of the first and second floors of the building.

Figure 3A:
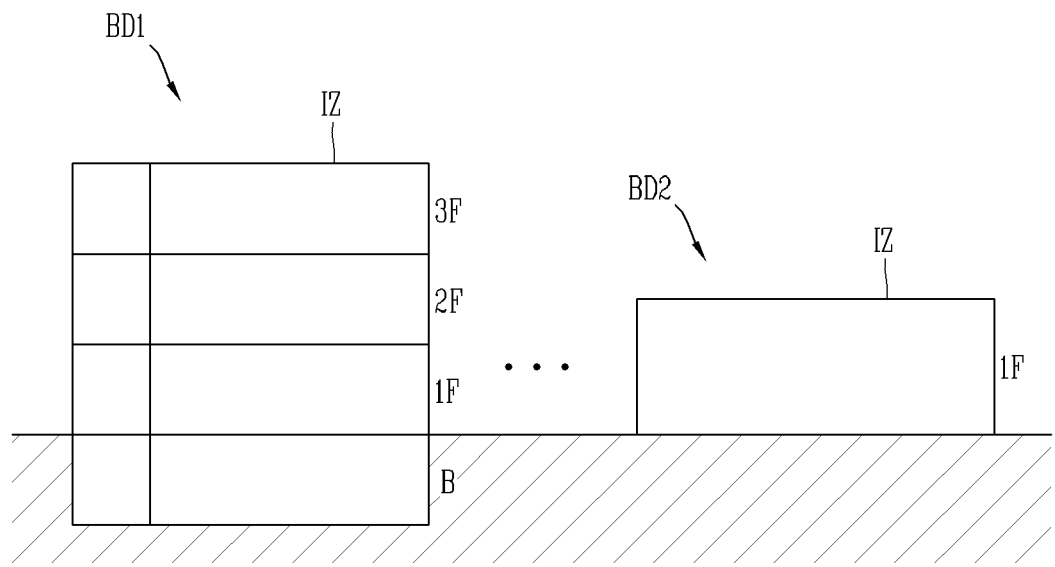
FIG. 3A is an example view 2-*a* showing an example of a driving region according to an embodiment of the present disclosure.
Figure 3B:
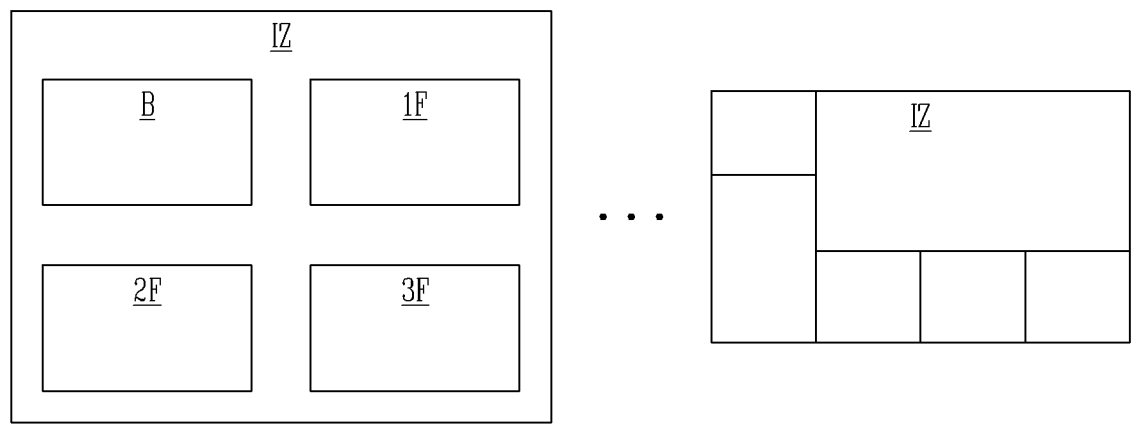
FIG. 3B is an example view 2-*b* showing an example of a driving region according to an embodiment of the present disclosure.

In addition, the driving region may further include at least a portion of the indoor zone IZ in each of a plurality of buildings BD1 and BD2, as shown in FIGS. 3A and 3B. In other words, the delivery robot 100 may drive in at least a portion of the indoor zone IZ in each of the plurality of buildings BD1 and BD2 with one or more floors. For instance, each floor in a first building consisting of a basement, and one to three floors, and a second building consisting of a single story may be included in the driving region, thereby allowing the delivery robot 100 to drive on each of the basement, first to third floors in the first building, and the first floor of the second building.

Figure 4:
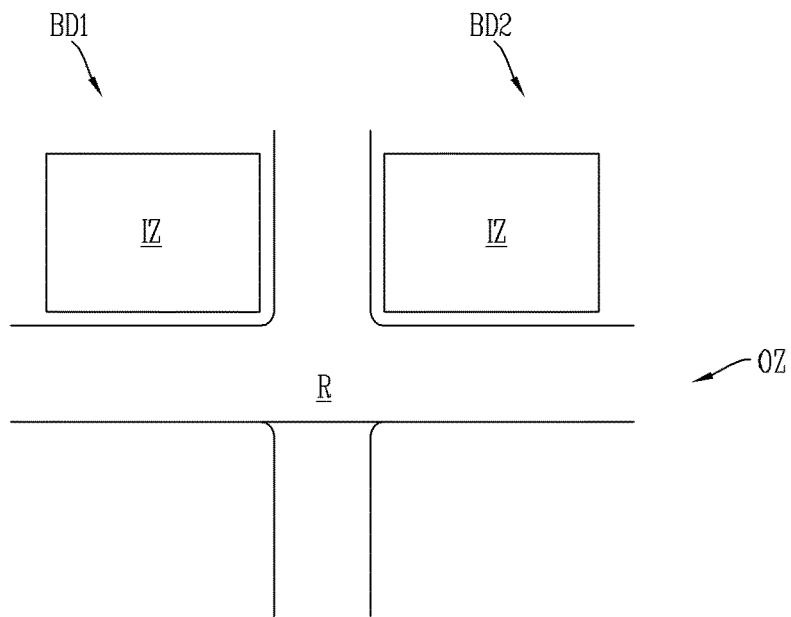
FIG. 4 is an example view 3 showing an example of a driving region according to an embodiment of the present disclosure.

In addition, the driving region may further include an outdoor zone OZ in one or more buildings BD1 and BD2, as shown in FIG. 4. In other words, the delivery robot 100 may drive in the outdoor zone OZ in the one or more buildings BD1 and BD2. For instance, a movement path around one or more buildings and leading to the one or more buildings may be further included in the driving region, thereby allowing the delivery robot 100 to drive on the movement path around one or more buildings and leading to the one or more buildings.

The delivery system 10000 may be a system in which a delivery service is provided through the delivery robot 100 in the driving region. In the delivery system 10000, the delivery robot 100 may perform a specific operation while autonomously driving in the driving region including indoor and outdoor zones, and for instance, the delivery robot 100 may transport products while moving from one point to a specific point in the driving region. In other words, the delivery robot 100 may perform a delivery operation of delivering the products from the one point to the specific point. Accordingly, a delivery service through the delivery robot 100 may be performed in the driving region.

Hereinafter, a detailed configuration of the delivery robot 100 will be described.

Figure 5:
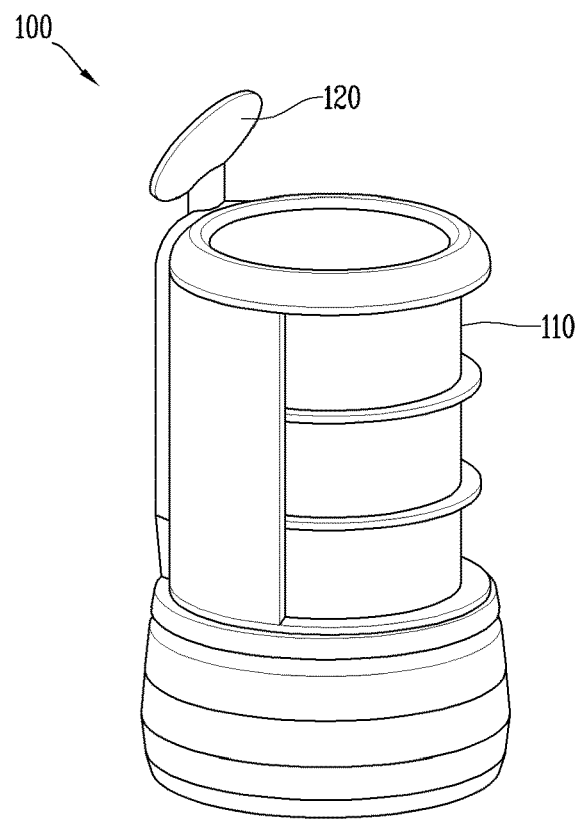
FIG. 5 is an example view showing an external configuration of a delivery robot according to an embodiment of the present disclosure.

As shown in FIG. 5, the delivery robot 100 may include one or more loading units 110 in a main body. The loading unit 110 may be formed of one or more divided loading spaces in which products can be loaded. In other words, the loading unit 110 may include a plurality of loading spaces to allow one or more products to be loaded separately. In this case, the loading space may be defined in various shapes to allow various groups of products having different sizes to be loaded. The loading space may be an enclosed or closed space, or at least a partially open space. In other words, the loading space may include a space divided only by a partition or the like. A product loaded in the loading unit 110 may be one product or a set of products delivered to a specific customer. The shape and/or structure of the loading unit 110 may be defined in various shapes in the main body.

For instance, the loading unit 110 may be implemented in the form of a drawer that is movable in a horizontal direction in the main body.

The loading unit 110 may include a cradle on which a product can be mounted. The cradle may be implemented as a bottom surface of the loading unit 110, or may be implemented as an additional structure attached to the bottom surface of the loading unit 110. In this case, the cradle may be configured to be tiltable, and the delivery robot 100 may further include a configuration for tilting the cradle.

An external configuration of the delivery robot 100 as shown in FIG. 5 is merely an illustration for describing an example of the delivery robot 100, and the external configuration of the delivery robot 100 may be configured in a structure/form other than the illustration shown in FIG. 5, and may further include a configuration different from the foregoing configuration.

Figure 6:
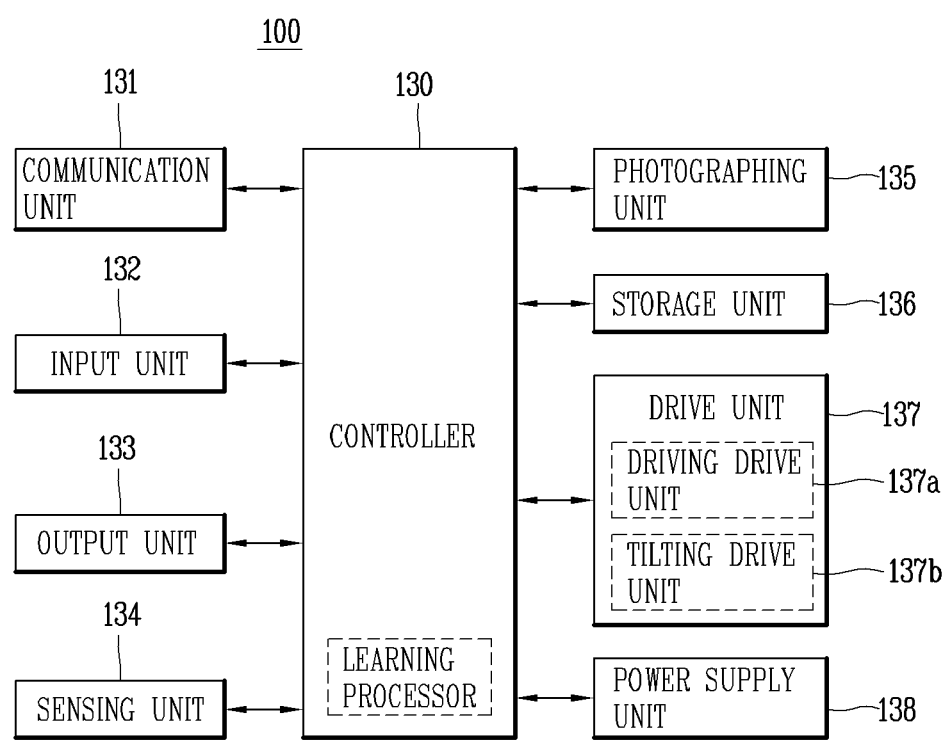
FIG. 6 is an example view showing an internal configuration of a delivery robot according to an embodiment of the present disclosure.

On the other hand, as illustrated in FIG. 6, the delivery robot 100 may include a communication unit 131, an input unit 132, an output unit 133, a sensing unit 134, a photographing unit 135, and a storage unit 136, a drive unit 137, a power supply unit 138, and a controller 130. Here, the elements illustrated in FIG. 6 are not essentially required, and the delivery robot 100 may be implemented by more or fewer elements than the illustrated elements.

The communication unit 131 may include one or more wired/wireless communication modules to transmit and receive information or data to and from communication target devices such as the control server 200 and the communication device 300.

The communication unit 131 may transmit and receive sensor information, a user input, a learning model, a control signal, and the like to and from the communication target devices. The communication unit 131 may further include a GPS module that receives a GPS signal from a GPS satellite. In addition, the communication unit 131 may further include a signal reception module capable of receiving a signal transmitted from a signal transmission module provided in the driving region, for instance, at least one of a reception module that receives an ultrasonic signal, a reception module that receives an Ultra-Wide Band (UWB) signal, and a reception module that receives an infrared signal.

The communication unit 131 may receive map information of the driving region from the control server 200 and the communication device 300. The map information may be map information on indoor and outdoor zones in the driving region. The map information may include information on at least one of a location of an indoor zone, a structure, an arrangement, a location of an outdoor zone, a road, a road surface condition, and an inclination angle. The communication unit 131 may provide the received map information to the controller 130. The map information may be used for the determination of a delivery path and/or the driving of the delivery robot 100. The map information may be stored in the storage unit 136.

On the other hand, there may be no limit to a range of area in which the delivery robot 100 is able to deliver a product. However, a delivery range of the delivery robot 100 may be limited to a predetermined region according to a capacity of a battery (power supply unit) of the delivery robot 100, an efficiency of a delivery service, and the like. In this case, the map information may include map information on an entire area that covers the delivery range of the delivery robot 100. In addition, the map information may include only map information on a nearby area that falls within a predetermined range based on a current location of the delivery robot 100.

The communication unit 131 may receive the map information at predetermined intervals. Furthermore, the communication unit 131 may receive the map information when there is a request from the controller 130.

The communication unit 131 may receive product information from the control server 200 or the communication device 300. The product information, including identification information of the product, may include information on at least one of a type, a size, a weight, a shipping address and a destination address, and a delivery date of the product. The communication unit 131 may provide the received product information to the controller 130. The product information may be stored in the storage unit 136.

The communication unit 131 may transmit information on an operation state to the controller 130, and receive a control command for an operation from the controller 130. The communication unit 131 may operate according to the control command received from the controller 130. In other words, the communication unit 131 may be controlled by the controller 130.

The input unit 132 may include at least one of input elements such as at least one button, a switch, a touchpad, a microphone for acquiring an audio signal, and the like, and an output element such as a display to receive various types of data including user commands, and output the operating state of the delivery robot 100.

For example, a command for the execution of a delivery service may be input through the display, and a state for the execution of the delivery service may be output. Here, the display may be configured with any one of a light emitting diode (LED), a liquid crystal display (LCD), a plasma display panel, and an organic light emitting diode (OLED). The elements of the input unit 132 may be disposed in various locations in consideration of the convenience of a shipper or a recipient. For example, as illustrated in FIG. 5, the input unit 132 may be disposed on a head unit 120 of the delivery robot 100.

The input unit 132 may display an operation state of the delivery robot 100 through the display, and display a control screen on which a control operation of the delivery robot 100 is carried out. The control screen may refer to a user interface screen on which a driving state of the delivery robot 100 is displayed, and to which a command for a driving operation of the delivery robot 100 is input from a user. The control screen may be displayed on the display through the control of the controller 130, and the display on the control screen, the input command, and the like may be controlled by the controller 130.

The input unit 132 may receive the product information from the shipper. Here, the product information may be used as learning data for training an artificial neural network. In this case, the artificial neural network may be trained to output a type of a product corresponding to the image, voice, and text indicating the product. The input unit 132 may provide the received product information to the controller 130.

The input unit 132 may also acquire input data to be used when acquiring an output using learning data and a learning model for training the artificial neural network. The input unit 132 may acquire unprocessed input data, and in this case, the controller 130 may extract an input feature point by preprocessing the input data.

The input unit 132 may transmit information on an operation state to the controller 130, and receive a control command for an operation from the controller 130. The input unit 132 may operate according to a control command received from the controller 130. In other words, the input unit 132 may be controlled by the controller 130.

The output unit 133 may generate an output related to visual, auditory or tactile sense. The output unit 133 may include a display that outputs visual information, a speaker that outputs auditory information, and a haptic module that outputs tactile information. At least some elements of the output unit 133 may be disposed on the head unit 120 of the delivery robot 200 together with the input unit 132.

When an event occurs during the operation of the delivery robot 100, the output unit 133 may output an alarm related to the event. For example, when the operating power of the delivery robot 100 is exhausted, a shock is applied to the delivery robot 100, or an accident occurs in the driving region, an alarm voice may be output to transmit information on the accident to the surroundings.

The output unit 133 may transmit information on an operation state to the controller 130, and receive a control command for an operation from the controller 130. The output unit 133 may operate according to a control command received from the controller 130. In other words, the output unit 133 may be controlled by the controller 133.

The sensing unit 134 may include one or more sensors that sense information on the posture and operation of the delivery robot 100. For instance, the sensing unit 134 may include at least one of a tilt sensor that senses a movement of the delivery robot 100 and a speed sensor that senses a driving speed of the drive unit 11. When the delivery robot 100 is inclined in a front, rear, left, or right direction, the tilt sensor may calculate an inclined direction and angle thereof to sense the posture information of the delivery robot 100. A tilt sensor, an acceleration sensor, or the like may be used for the tilt sensor, and any of a gyro type, an inertial type, and a silicon semiconductor type may be applied in the case of the acceleration sensor. Moreover, in addition, various sensors or devices capable of sensing the movement of the delivery robot 100 may be used. The speed sensor may be a sensor that senses a driving speed of a driving wheel provided in the delivery robot 100. When the driving wheel rotates, the speed sensor may sense the rotation of the driving wheel to detect the driving speed.

The sensing unit 134 may further include various sensors for sensing internal information, surrounding environment information, user information, and the like of the delivery robot 100. For instance, a proximity sensor, an RGB sensor, an IR sensor, an illuminance sensor, a humidity sensor, a fingerprint recognition sensor, an ultrasonic sensor, an optical sensor, a 3D sensor, a microphone, a light detection and ranging (lidar), a radio detection and ranging (radar), a cliff detection sensor, and any combinations thereof capable of detecting an obstacle in the driving region while the delivery robot 100 is driving in the driving region may be further included in the sensing unit 134.

Here, the cliff detection sensor may be a sensor in which one or more of an infrared sensor having a light emitting unit and a light receiving unit, an ultrasonic sensor, an RF sensor, and a position sensitive detector (PSD) sensor are combined. The PSD sensor is a type of infrared sensor that uses infrared rays to transmit infrared rays and then measure an angle of infrared rays reflected from and returned back to an obstacle to measure a distance. In other words, the PSD sensor may calculate a distance from the obstacle using a triangulation method. Sensor data acquired by the sensing unit 134 may be a basis for allowing the delivery robot 100 to autonomously drive.

The sensing unit 134 may transmit information on a sensing result to the controller 130, and receive a control command for an operation from the controller 130. The sensing unit 134 may operate according to a control command received from the controller 130. In other words, the sensing unit 134 may be controlled by the controller 130.

The photographing unit 135 may include one or more cameras (sensors) that photograph the surroundings of the delivery robot 100. The photographing unit 135 may generate image information on the driving region by photographing the surroundings while the delivery robot 100 is driving in the driving region. The photographing unit 135 may photograph the front of the delivery robot 100 to sense an obstacle present in the vicinity of the delivery robot 100 and in the driving region. The photographing unit 135 as a digital camera may include an image sensor. The image sensor, which is a device that converts an optical image into an electrical signal, is composed of a chip in which a plurality of photo diodes are integrated, and a pixel is exemplified as a photo diode. Charges are accumulated in each of the pixels by an image formed on the chip by light passing through a lens, and the charges accumulated in the pixels are converted into an electrical signal (e.g., voltage). For the image sensor, CCD (Charge Coupled Device), CMOS (Complementary Metal Oxide Semiconductor), or the like are well known. In addition, the photographing unit 135 may include the image processing unit DSP that generates the image information through image processing on the photographed result.

The photographing unit 135 including the image sensor and the image processing unit may include at least one of a 2D camera sensor and a 3D camera sensor. Here, the three-dimensional camera sensor may be attached to one side or a part of the deliver robot 100 to generate three-dimensional coordinate information related to the surroundings of the main body of the delivery robot 100. In other words, the three-dimensional camera sensor may be a three-dimensional (3D) depth camera that calculates a near and far distance of the delivery robot 100 and an object to be photographed. Specifically, the three-dimensional camera sensor may photograph a two-dimensional image related to the surroundings of the delivery robot 100, and generate a plurality of three-dimensional coordinate information corresponding to the photographed two-dimensional image.

The three-dimensional camera sensor may include two or more cameras that acquire a conventional two-dimensional image, and may be formed in a stereo vision manner to combine two or more images acquired from the two or more cameras to generate three-dimensional coordinate information. Specifically, the three-dimensional camera sensor may include a first pattern irradiation unit for irradiating light with a first pattern in a downward direction toward the front of the main body of the delivery robot 100, and a second pattern irradiation unit for irradiating the light with a second pattern in an upward direction toward the front of the main body, and an image acquisition unit for acquiring an image in front of the main body. As a result, the image acquisition unit may acquire an image of an area where light of the first pattern and light of the second pattern are incident. The three-dimensional camera sensor may include an infrared ray pattern emission unit for irradiating an infrared ray pattern together with a single camera to photograph the shape of the infrared ray pattern irradiated from the infrared ray pattern emission unit onto the object to be photographed, thereby measuring a distance between the sensor and the object to be photographed. Such a three-dimensional camera sensor may be an infrared (IR) type three-dimensional camera sensor. In addition, the three-dimensional camera sensor may include a light emitting unit that emits light together with a single camera to receive part of laser emitted from the light emitting unit and reflected from the object to be photographed, and analyze the received laser, thereby measuring a distance between the three-dimensional camera sensor and the object to be photographed. Such a three-dimensional camera sensor may be a time-of-flight (TOF) type three-dimensional camera sensor. Specifically, the laser of the above-described three-dimensional camera sensor is configured to irradiate a laser beam in the form of extending in at least one direction. In one example, the three-dimensional camera sensor may include first and second lasers, in which the first laser irradiates a linear shaped laser intersecting each other, and the second laser irradiates a single linear shaped laser. According to this, the lowermost laser is used to sense obstacles in the bottom portion, the uppermost laser is used to sense obstacles in the upper portion, and the intermediate laser between the lowermost laser and the uppermost laser is used to sense obstacles in the middle portion.

Meanwhile, the photographing unit 135 may acquire an image by photographing the vicinity of the delivery robot 100 while the delivery robot 100 drives in the driving region, and the controller 130 may recognize a current location of the delivery robot 100 based on the photographed and acquired image by the photographing unit 135. Hereinafter, an image acquired by the photographing unit 135 is defined as an "acquired image". The acquired image may include various features such as lights located on the ceiling, edges, corners, blobs, and ridges. The controller 130 detects a feature from each of the acquired images, and calculates a descriptor based on each feature point.

Here, the descriptor denotes data in a predetermined format for representing a feature point, and denotes mathematical data in a format capable of calculating a distance or a degree of similarity between the descriptors. For example, the descriptor may be an n-dimensional vector (n is a natural number) or data in a matrix format. The controller 130 classifies at least one descriptor for each acquired image into a plurality of groups according to a predetermined sub-classification rule based on descriptor information obtained through the acquired image at each location, and converts descriptors included in the same group according to a predetermined sub-representative rule into sub-representative descriptors, respectively.

For another example, all descriptors collected from acquired images within a predetermined zone such as a room are classified into a plurality of groups according to a predetermined sub-classification rule, and descriptors included in the same group according to the predetermined sub-representative rule are respectively classified as sub-representative descriptors. The controller 130 may obtain the feature distribution of each location through this process. Each location feature distribution may be expressed as a histogram or an n-dimensional vector. For another example, the controller 130 may estimate an unknown current location based on descriptors calculated from each feature point without going through a predetermined sub-classification rule and a predetermined sub-representative rule. Furthermore, when the current location of the delivery robot 100 becomes unknown due to a location jump or the like, the current location may be estimated based on data such as a pre-stored descriptor or a sub-representative descriptor.

The photographing unit 135 may generate an acquired image by photographing an image at an unknown current location. The controller 130 detects various features such as lights located on the ceiling, edges, corners, blobs, and ridges through the acquired image to calculate a descriptor.

The controller 130 may convert the acquired image into information (sub-recognition feature distribution) that is comparable with location information to be compared (e.g., feature distribution of each location) according to a predetermined sub-conversion rule based on at least one descriptor information obtained through the acquired image of the unknown current location.

According to a predetermined sub-comparison rule, each location feature distribution may be compared with each recognition feature distribution to calculate each degree of similarity. A degree of similarity (probability) may be calculated for the location corresponding to each location, and a location from which the greatest probability is calculated may be determined as a current location. Accordingly, the controller 130 may divide a zone in the driving region, and generate a map consisting of a plurality of areas, or recognize the current location of the delivery robot 100 based on a pre-stored map.

The photographing unit 135 may transmit a photographing result including the acquired image to the controller 130, and may receive a control command for an operation from the controller 130. The photographing unit 135 may operate according to a control command received from the controller 130. In other words, the photographing unit 135 may be controlled by the controller 130.

The storage unit 136 may be a storage element that stores data that can be read by a microprocessor. The storage unit 136 may include at least one of a hard disk drive (HDD), a solid state disk (SSD), a silicon disk drive (SDD), a ROM, a RAM, a CD-ROM, a magnetic tape, a floppy disk, and an optical data storage device. The storage unit 136 may store data supporting various functions of the delivery robot 100. The storage unit 136 may store data calculated/processed by the controller 130. The storage unit 136 may also store information or data received by the communication unit 131, input information acquired by the input unit 132, input data, learning data, a learning model, a learning history, and the like. For instance, at least one of the product information and the map information received from the communication unit 131 or the input unit 132 may be stored in the storage unit 136. In this case, the map information and the product information may be previously collected from the control server 200 and stored in the storage unit 136, and may be periodically updated. In addition, data related to the driving of the delivery robot 100, for instance, program data such as an operating system, firmware, an application, and software of the delivery robot 100.

The drive unit 137 may be a driving element that drives the physical operation of the delivery robot 100. The drive unit 137 may include a driving drive unit 137a. The driving drive unit 137a, as driving wheels provided under the main body of the delivery robot 100, may be rotationally driven to drive the delivery robot 100 to drivel in the driving region. The driving drive unit 137a may include an actuator or a motor operating according to a control signal of the controller 130 to move the delivery robot 100. The driving drive unit 137a may rotate the driving wheels provided at each left/right side of each front/rear side of the main body in both directions to rotate or move the main body. In this case, the left and right wheels may move independently. Furthermore, the driving drive unit 137a may move the main body forward, backward, leftward, and rightward, or may allow the main body to drive in a curve or rotate in place. The driving drive unit 137a may further include a wheel, a brake, a propeller, and the like operated by an actuator or a motor.

The drive unit 137 may further include a tilting drive unit 137b. The tilting drive unit 137b may tilt the cradle of the loading unit 110 according to a control signal of the controller 130. The tilting drive unit 137b may tilt the cradle using various methods known to those skilled in the art. The tilting drive unit 137b may include an actuator or a motor for operating the cradle.

The drive unit 137 may transmit information on a driving result to the controller 130, and receive a control command for an operation from the controller 130. The drive unit 137 may operate according to a control command received from the controller 130. In other words, the drive unit 137 may be controlled by the controller 130.

The power supply unit 138 may include the battery that can be charged by external commercial power to supply power stored in the battery into the delivery robot 100. Here, the battery may store power collected by sunlight or harvesting in the battery in addition to the external commercial power. The power supply unit 138 supplies driving power to each of the components included in the delivery robot 100 to supply operating power required for the delivery robot 100 to drive or perform a specific function. Here, the controller 130 may sense the remaining power of the battery, and control the battery to move power to a charging unit connected to the external commercial power source when the remaining power is insufficient, and thus a charge current may be supplied from the charging unit to charge the battery.

The battery may be connected to a battery sensing unit to transmit a remaining power level and a charging state to the controller 130. At this time, the output unit 133 may display the remaining amount of the battery by the controller 130.

The controller 130 may perform overall operation control of the delivery robot 100. The controller 130 may be configured in a modular form including one or more processors for processing information to perform learning, inference, perception, calculation, determination and signal processing of information on the operation control of the delivery robot 100 in the processor. The processor may refer to a data processing device embedded in hardware having a physically structured circuit to perform a function written as a code or an command included in a program. An example of the data processing device embedded in hardware as described above may be one of a mobile processor, an application processor (AP), a microprocessor, a central processing unit (CPU), a graphic processing unit (GPU), a neural processing unit (NPU), a processor core, a multiprocessor, an application-specific integrated circuit (ASIC), and a field programmable gate array (FPGA).

The controller 130 may determine at least one executable operation of the delivery robot 100 based on information determined or generated using a data analysis algorithm or a machine learning algorithm. The controller 130 may perform at least one of learning, inference, and processing on a vast amount of information (big data), such as information stored in the delivery robot 100, environmental information around the driving region, and information stored in a communicable external storage.

Furthermore, the controller 130 may predict (or infer) at least one executable operation of the robot 100 based on the learned information learned, and determine the most feasible operation among the at least one predicted operation to control the delivery robot 100 to perform the determined operation.

In this case, the controller 130 may control at least one of the elements of the delivery robot 100 to perform the determined operation. For instance, according to a target operation of the delivery robot 100, the controller 130 may control the communication unit 131, the input unit 132, the output unit 133, the sensing unit 134, the photographing unit 135, the storage unit 136, the drive unit 137, and the power supply unit 138 to control the target operation to be performed.

Furthermore, the controller 130 may further control other elements included in the delivery robot 100 in addition to the above elements.

Meanwhile, the controller 130 may further include a learning processor for performing artificial intelligence and/or machine learning. In this case, the learning processor may be manufactured in a separate configuration from the controller 130 and configured in a modular form embedded in the controller 130, or may be configured as part of the controller 130.

In addition, the controller 130 itself may be configured with an artificial intelligence processor mounted with the learning processor. The controller 130 may request, search, receive, or utilize information or data of the learning processor or the storage unit 136, and may control one or more of the elements of the delivery robot 100 to execute a predicted operation or an operation determined to be preferred among at least one executable operation.

The controller 130 may control at least part of the elements of the delivery robot 100 in order to drive an application program stored in the storage unit 136. Moreover, in order to drive the application program, the controller 130 may operate two or more of the elements included in the delivery robot 100 in combination with one another. Furthermore, the controller 130 may generate a control signal for controlling the external device when it is necessary to link with an external device such as the control server 200 and the communication device 300 to perform the determined operation, and transmit the generated control signal to the external device.

Meanwhile, the controller 130 may use training data stored in one or more of the control server 200, the communication device 300, and the storage unit 136.

In addition, the controller 130 may be mounted with a learning engine that detects a feature for recognizing a predetermined object to recognize the object through the learning engine. Here, the feature for recognizing an object may include a size, a shape, a shade and the like of the object. Specifically, when the controller 130 inputs part of images acquired through the photographing unit 135 to the learning engine, the learning engine may recognize at least one thing or creature included in the input images.

Furthermore, the learning engine as described above may be mounted on one or more of external servers included in the control server 200 and the communication device 300. When the learning engine is mounted on at least one of the control server 200 and the external server, the controller 130 may control the communication unit 131 to transmit at least one image that is subjected to analysis to one or more of the control server 200 and the external server.

In this case, one or more of the control server 200 and the external server that has received image data may input the image received from the delivery robot 100 to the learning engine, thereby recognizing at least one thing or creature included in the image. Moreover, one or more of the control server 200 and the external server that has received the image data may transmit information related to the recognition result back to the delivery robot 100. At this time, the information related to the recognition result may include information related to the number of objects included in the image that is subjected to analysis, and a name of each object.

The controller 130 may control the driving drive unit 137a to allow the delivery robot 100 to drive in the driving region according to a setting. The controller 130 may control the driving drive unit 137a to control the delivery robot 100 to drive straight or in rotation. The controller 130 may control the driving drive unit 137a based on sensor data received from the sensing unit 134 for autonomous driving in the driving region. The controller 130 may control the driving drive unit 137a in various ways known to those skilled in the art to allow the delivery robot 100 to autonomously drive to a delivery destination.

The controller 130 may set a movement path capable of moving from the driving region to a destination based on information received through the communication unit 131, for instance, information on a location of the delivery robot 100. In other words, the controller 130 may determine and set a movement path capable of moving to a destination based on the current location, and control the delivery robot 100 to drive accordingly.

To this end, the controller 130 may receive map information, road information, and necessary information on an area to be moved from one or more of the control server 200 and the communication device 300, and store the received information in the storage unit 136. For example, the controller 130 may drive a navigation application stored in the storage unit 136 to control the driving of the delivery robot 100 to move to a place input by a user.

Furthermore, the controller 130 may control driving to avoid an obstacle in the driving region according to information input by at least one of the sensing unit 134 and the photographing unit 135. In this case, the controller 130 may reflect information on the obstacle in information on the driving region pre-stored in the storage unit 136, for instance, the map information.

Here, a specific example in which the controller 130 determines and sets a movement path for delivering a product will be described with reference to FIGS. 7A and 7B.

The controller 130 may determine and set a movement path based on the determined or input type of the product. The controller 130 may refer to map information stored in the storage unit 136 to set the movement path. The controller 130 may determine the shortest path to a delivery destination, alternative paths, expected arrival time, and the like using various methods known to those skilled in the art. The controller 130 may determine a delivery sequence of products based on delivery distances or expected delivery times of the products. Here, the delivery distance may denote a distance to a delivery destination, and the expected delivery time may denote an estimated time required to reach the delivery destination. Referring to FIGS. 7A and 7B, the controller 130 may determine delivery distances or expected delivery times with reference to the locations of delivery destinations A, B, and C, and in this case, the delivery robot 100 may determine not only delivery distances or expected delivery times from a current location 410 of the delivery robot 100 to the delivery destinations A, B, and C, respectively, but also delivery distances or expected delivery times between the delivery destinations A, B, and C. The controller 130 may set the movement path based on the determination result, and control the delivery robot 100 to drive to perform delivery accordingly.

Figure 7A:
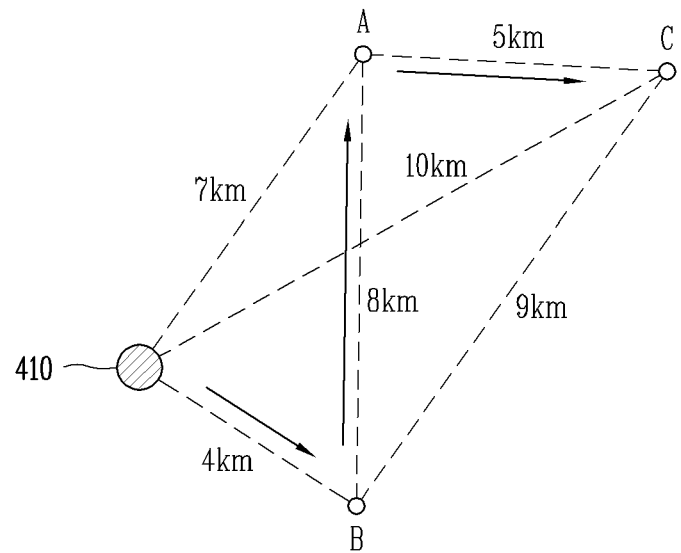
FIG. 7A is an example view a showing an example of setting a movement path of a delivery robot according to an embodiment of the present disclosure.
Figure 7B:
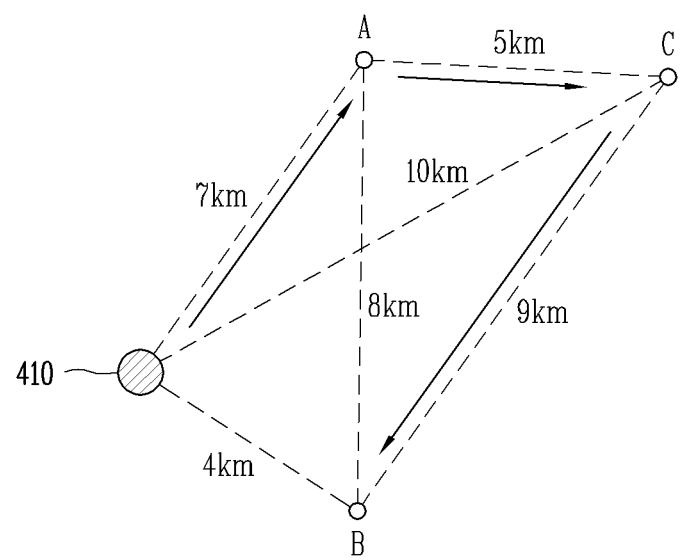
FIG. 7B is an example view b showing an example of setting the movement path of the delivery robot according to an embodiment of the present disclosure.

For an example, the controller 130 may set a delivery sequence in the order of a nearest delivery destination B, a delivery destination A and a delivery destination C (i.e., B-A-C) from the current location 410 to perform deliveries in the minimum time as illustrate in FIG. 7A, or the controller 130 may set the delivery sequence in the order of the delivery destination A, the delivery destination C, and the delivery destination B (A-C-B) to drive in the shortest distance from the current location 410.

Meanwhile, the controller 130 may adjust a movement speed of the delivery robot 100 or a tilted angle of the cradles of the loading unit 110 based on a condition of a road surface or an inclination angle of the road surface in the driving region. Information on the condition or inclination angle of the road surface may be included in the map information.

The controller 130 may acquire information on the condition or inclination angle of the road surface in the driving region currently being driven or to be driven by referring to the map information. In addition, the controller 130 may determine the condition or inclination angle of the road surface in the driving region based on data from one or more of the communication unit 131, the input unit 132, the sensing unit 134, and the photographing unit 135.

In this case, whether the road surface is in good condition may be determined based on a vibration generated in the delivery robot 100, and the inclination angle of the road surface may be determined from a posture or inclination of the delivery robot 100. In this case, the controller 130 may control the driving drive unit 137*a* based on at least one of the condition or inclination angle of the surface condition to adjust the movement speed of the delivery robot 100.

For example, the controller 130 may decrease the movement speed when a vibration above a predetermined level is generated in the delivery robot 100 or the delivery robot 100 drives on a downhill road. Furthermore, the controller 130 may control the tilting drive unit 137*b* based on the inclination angle of the road surface to adjust the tilted angle of the cradle. For example, when the delivery robot 100 drives on an uphill or downhill road, the angle may be adjusted in a direction to offset leaning induced by the uphill road or the downhill road.

In addition, the controller 130 may determine a network shadow region located on the movement path based on a pre-learned network performance estimation model based on time and location. Specifically, the controller 130 may estimate a network performance numerical rating according to time at each predetermined point set on the movement path through the network performance estimation model, and determine a network shadow region located on the movement path based on the estimated network performance numerical rating.

Specifically, the controller 130 may determine a network shadow region located on the movement path when the estimated network performance numerical rating is below a predetermined rating. Furthermore, the determination of the network shadow region may be performed by at least one of the information providing system 320 included in the control server 200 and the communication device 300 to be provided to the delivery robot 100. The controller 130 may update the movement path to avoid the determined network shadow region, and may control the drive unit 137 to move along the updated movement path.

Here, the network shadow region may refer to a point where it is difficult for a currently used application program to perform a normal operation. For instance, the network shadow region may be a region in which the network performance numerical rating is below a predetermined value, and may be region in which it is difficult to receive or transmit predetermined information or in which data is transmitted at a rate lower than a reference value. For example, the network shadow region may be a region in which a base station is not installed, a hotspot area, an underpass, a tunnel, and the like, but the present disclosure is not limited thereto.

When it is difficult to avoid the network shadow region, the controller 130 may store information necessary to pass through the network shadow region in the storage unit 136 prior to entering the network shadow region. Furthermore, the controller 130 may control the drive unit 137 to directly pass through the network shadow region without performing an attempt to avoid the network shadow region.

At this time, the controller 130 may store information necessary for an application program in use or scheduled to be used prior to passing through the network shadow region in the storage unit 136 in advance, and large size information (such as photographed images) to be transmitted may be transmitted to one or more of the control server 200 and the communication device 300 in advance.

The controller 130 may extract region feature information based on the acquired images acquired through the photographing unit 135. Here, the extracted region feature information may include a set of probability values for a region and a thing recognized based on the acquired images. The controller 130 may determine a current location based on SLAM-based current location node information and the extracted region feature information.

Here, the SLAM-based current location node information may correspond to a node most similar to the feature information extracted from the acquired image among pre-stored node feature information. In other words, the controller 1800 may perform location recognition using feature information extracted from each node to select the current location node information.

In addition, in order to further improve the accuracy of location estimation, the controller 130 may perform location recognition using both feature information and region feature information to increase the accuracy of location recognition. For example, the controller 130 may select a plurality of candidate SLAM nodes by comparing the extracted region feature information with pre-stored region feature information, and determine current location based on candidate SLAM node information most similar to the SLAM-based current location node information among the plurality of the selected candidate SLAM nodes.

Alternatively, the controller 130 may determine SLAM-based current location node information, and correct the determined current location node information according to the extracted region feature information to determine a final current location. In this case, the controller 130 may determine a node most similar to the extracted region feature information among pre-stored region feature information of nodes existing within a predetermined range based on the SLAM-based current location node information as the final current location.

For a location estimation method using an image, a global feature describing an overall shape of an object rather than a local feature as well as a location estimation method using a local feature point such as a corner may be used for location estimation, thereby extracting a feature that is robust to an environmental change such as lighting/illuminance.

For example, the controller 130 may extract and store region feature information (e.g., building exterior, road, outdoor structure/facility, indoor structure/facility, ceiling, stairs, etc.) during map generation, and then estimate the location of the delivery robot 100 using various region feature information. In other words, according to the present disclosure, it may be possible to store a feature in the unit of thing, object and region instead of using only a specific point in the image when storing the environment, thereby allowing location estimation that is robust to a change in lighting/illuminance.

On the other hand, when the delivery robot 100 enters a blind zone formed by a thing, a field of view of the photographing unit 135 may be blocked, thereby preventing an image having a sufficient feature point such as a corner from being acquired. Alternatively, in an environment with a high ceiling, the accuracy of extracting a feature point using the ceiling image may be lowered at a specific location. However, the controller 130 according to an embodiment may recognize a current location using the region feature information even when an identification accuracy of feature point is low due to a high ceiling.

The delivery robot 100 configured as described above may perform an operation according to a plurality of operation modes. Here, the operation mode refers to a mode in which the delivery robot 100 performs an operation according to a predetermined reference, and one of the plurality of operation modes may be set through one or more of the delivery robot 100, the control server 200, and the communication device 300.

For instance, a control screen according to an operation mode set in one or more of the delivery robot 100, the control server 200, and the communication device 300 may be displayed, and the delivery robot 100 may perform an operation according to the operation mode in response to the manipulation of the control screen. In other words, the delivery system 10000 may control the operation of the delivery robot 100 and perform the resultant operation according to any one or more set operation modes among the plurality of operation modes.

Meanwhile, the sensing unit 134 of the delivery robot 100 according to an embodiment of the present disclosure may include at least one sensor for recognizing an environment around the delivery robot 100. The sensors may sense a thing, an environment, or a geographic feature around the delivery robot 100, and may sense physical properties such as a shape and a distance from a sensing target.

To this end, the sensing unit 134 may include at least one camera sensor for sensing the shape and type of a thing, a light detection and ranging (LiDAR) sensor for measuring a distance to an object using a laser, an ultrasonic sensor (USS) that senses the presence or absence of an object, and a distance between the object and the delivery robot 100 using ultrasonic waves, and a time of flight (TOF) sensor that measures a distance between an object and the delivery robot 100 by measuring the time it takes between the emission of light and its return.

On the other hand, these sensors may be arranged to direct not only the front of the delivery robot 100, but also the rear or at least one side of the delivery robot 100. In this case, the sensors arranged on each side of the delivery robot 100 may sense an object located in a directed direction, and detect a distance between the sensed object and the delivery robot 100. Furthermore, information on the detected object and distance may be input to the controller 130 and used to control the driving of the delivery robot 100 by the controller 130.

Figure 8:
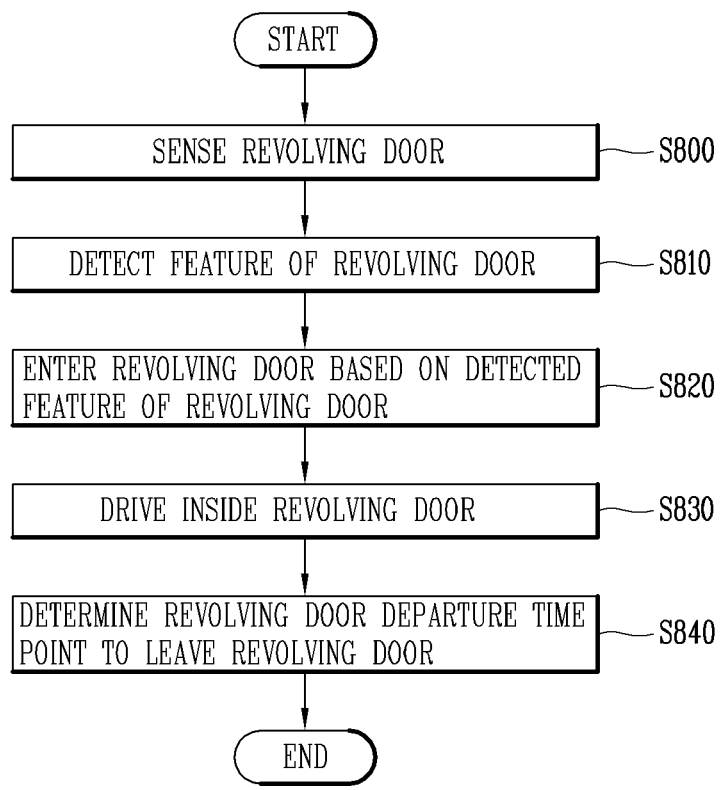
FIG. 8 is a flowchart illustrating an operation process in which a delivery robot detects a revolving door to pass through the detected revolving door according to an embodiment of the present disclosure according to an embodiment of the present disclosure.

FIG. 8 is a flowchart illustrating an operation process in which the delivery robot 100 detects a revolving door to pass through the detected revolving door according to an embodiment of the present disclosure.

Referring to FIG. 8, the controller 130 of the delivery robot 100 according to an embodiment of the present disclosure may first sense an environment around the delivery robot 100, and objects adjacent thereto based on the sensing result of the sensing unit 134. In addition, a region of interest may be extracted from sensed information, for example, image information, by estimating or measuring distance information between adjacent objects to remove unnecessary information (ground, sky, etc.). In addition, an image of the extracted region of interest may analyzed to sense whether there is a revolving door in front of the delivery robot 100 (S800).

Meanwhile, whether a revolving door is included in the region of interest in the step S800 may be determined through machine learning performed in advance through a plurality of learning data related to the revolving door. Alternatively, the controller 130 may sense a revolving door through an image recognition technology for recognizing the revolving door from shape features extracted from the image according to the pre-stored shape features of the revolving door.

On the other hand, the region of interest may be determined according to a distance away from the delivery robot 100. Therefore, even though the shape of a revolving door is included in the acquired image, when a distance between the delivery robot 100 and the revolving door exceeds a preset (or predetermined) distance, the controller 130 determines that the revolving door is not included in the region of interest extracted from the image.

On the contrary, when a distance between the delivery robot 100 and the revolving door is below a preset distance, the controller 130 may sense that there is a revolving door from the image of the revolving door included in the extracted region of interest.

Meanwhile, the step S800 of sensing a revolving door based on image data acquired from the sensing unit 134 will be described in more detail with reference to FIG. 9.

On the other hand, when it is determined that there is a revolving door, the controller 130 may detect the physical properties of the revolving door as the features of the revolving door (S810).

Here, the physical properties of the revolving door may be features according to a static or dynamic state of the revolving door. For an example, the static state of the revolving door may indicate features that are changed according to a rotational state of each door constituting the revolving door, that is, a location of the revolving door, the number of each door constituting the revolving door, a height of each door, a radius or rotational speed at which each door rotates, a size of space in between each door, and the like.

In addition, the dynamic state of the revolving door may indicate features that are changed according to a rotational state of each door constituting the revolving door, that is, a location of space in between each rotating door, a width of each door sensed through the image sensor, and the like.

For an example, the space in between each rotating door may be continuously moved in a clockwise or counterclockwise direction according to a direction in which each door rotates. Furthermore, since each door of the revolving door rotates at a constant speed about a rotation shaft, when the image of the revolving door is sensed from an entrance or exit of the revolving door, a distance between a door edge on the left side of the rotation shaft or a door edge on the right side of the rotation shaft may be continuously changed according to the rotation of each door on the sensed image. Accordingly, a width of the door on the left or right side of the rotation shaft sensed through the image sensor may be continuously changed according to the rotation of the revolving door.

The controller 130 may detect features according to the static state of the revolving door and features according to the dynamic state of the revolving door as the features of the revolving door. In addition, a speed at which the revolving door rotates may be detected based on the detected features of the revolving door. Furthermore, the number of revolving doors may be detected, and a space for the delivery robot 100 to enter may be determined among regions of the revolving door divided by each door according to the detected number of revolving doors. In addition, an entry time point and an entry direction to enter the entry space may be determined based on the rotational speed of the revolving door.

In addition, the controller 130 may generate a driving path for entering the revolving door according to the determined entry space, entry time, and entry direction, and calculate a linear speed and an angular speed for driving along the generated driving path. Furthermore, the controller 130 may control the drive unit 137 to drive the delivery robot 100 according to the calculated linear and angular speeds to control the delivery robot 100 to enter a region inside the revolving door, that is, the entry space (S820).

Meanwhile, when the delivery robot 100 enters the entry space inside the revolving door, the controller 130 may generate a driving path for driving in a region inside the revolving door. In addition, the drive unit 137 may be controlled to allow the delivery robot 100 to drive inside the revolving door region along the generated driving path (S830).

On the other hand, in step S830, the controller 130 may control the drive unit 137 to move the delivery robot 100 according to the movement of the entry space within the entry space whose location is changed by the rotation of the revolving door. In this case, in the entry space, the controller 130 may control the drive unit 137 to allow the delivery robot 100 to drive while maintaining a predetermined distance from each door and the rotation shaft of the revolving door, and an outer wall surrounding the revolving door.

To this end, the controller 130 may detect a distance between each of the doors of the revolving door close to the delivery robot 100 or the outer wall and the delivery robot 100. Furthermore, the linear and angular speeds may be calculated according to the detected distance and the rotational speed of the revolving door, and the drive unit 137 may be controlled to determine a driving speed of the delivery robot 100 according to the calculated linear and angular speeds. Therefore, even when a sudden change in the rotational speed of the revolving door or the stop of the revolving door occurs, the delivery robot 100 may be prevented from colliding with the revolving door and the outer wall.

On the other hand, while driving in a region inside the revolving door, the controller 130 may detect an exit of the revolving door, and calculate a departure time point to leave the revolving door region through the exit. To this end, the controller 130 may use a time when the delivery robot 100 enters the revolving door, a distance moved by the delivery robot 100, and physical properties information of the revolving door. For an example, the controller 130 may detect a location of the delivery robot 100 in the revolving door region or an entry space location inside the revolving door in which the delivery robot 100 is driving according to the calculated size of the revolving door region, the rotational speed of the revolving door, and the elapsed time since the delivery robot 100 enters the entry space. In addition, based on the detected location of the delivery robot 100 or the location of the entry space, it is possible to determine whether to leave the revolving door region.

Meanwhile, the controller 130 may detect the exit of the revolving door through image recognition or deep learning image recognition while the delivery robot 100 is driving in a region inside the revolving door. For an example, the controller 130 may detect a gap between a door in front of the delivery robot 100 and an outer wall surrounding the revolving door through the image recognition or deep learning image recognition. Furthermore, when a gap above a preset first size is detected, it may be determined that the exit of the revolving door is detected. In addition, when the gap is above a preset second size, it is determined that departure from the revolving door region is allowed through the detected exit, and the drive unit 137 can be controlled to allow the delivery robot 100 to leave the revolving door region (S840).

Figure 9:
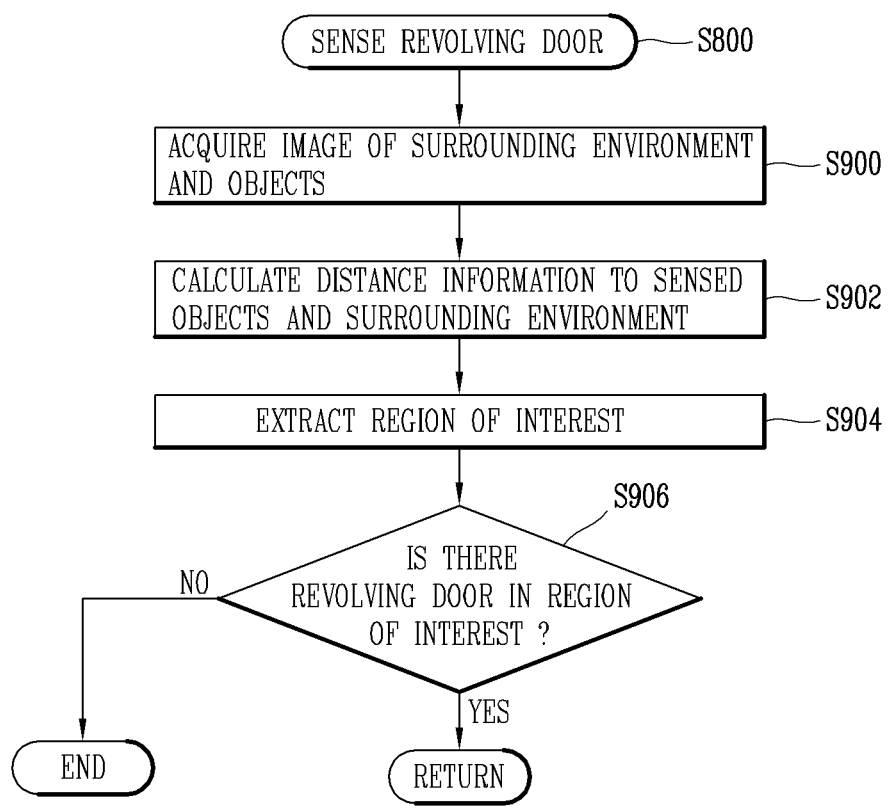
FIG. 9 is a flowchart more specifically illustrating an operation process of identifying a revolving door from a result of sensing a surrounding environment during the operation process of FIG. 8 according to an embodiment of the present disclosure.

On the other hand, FIG. 9 is a flowchart more specifically illustrating an operation process of identifying a revolving door from a result of sensing a surrounding environment during the operation process of FIG. 8.

Referring to FIG. 9, the controller 130 of the delivery robot 100 according to an embodiment of the present disclosure may acquire data that has sensed an environment around the delivery robot 100 from the sensors in the sensing unit 134 (S900). In this case, at least one of the sensors may be an image sensor capable of acquiring the 3D image. Furthermore, at least one of the sensors may be a sensor disposed to direct the delivery robot 100. Accordingly, the controller 130 may acquire an image of the front of the delivery robot 100 as data that has sensed the surrounding environment in the step S900.

Meanwhile, the acquired image may be a 3D image including distance information. Accordingly, the controller 130 may acquire distance information to each object and a geographic feature included in the acquired image (S902).

For an example, the controller 130 may calculate a distance value for each pixel of an image acquired from the camera sensor through matching of one camera sensor and a distance measuring sensor such as LiDAR or RADAR. Alternatively, when a plurality of camera sensors such as a stereo camera are used, a distance value for each pixel of the image may be calculated using a difference in viewing angle between a plurality of lenses.

In addition, the controller 130 may extract only a portion of the image as a region of interest (ROI) based on a geometrical positional relationship between the calculated distance values and the sensor that has acquired the image (S904).

For example, the controller 130 may regard an image region corresponding to a photographing angle above a preset angle with respect to an angle directed by the sensor as a noise component to remove the image region. As a result, an outer region of an image excluding a central region of a directivity angle of the sensor, such as a region including the sky or the ground, may be removed from the acquired image.

Furthermore, the controller 130 may regard a region in which a distance above or below a predetermined distance is detected from the acquired image as a noise region to remove the region. In this case, the ground region immediately below the delivery robot 100 or the sky region where the distance is not measured may be regarded as a noise region to remove the region. In addition, a region remaining after being removed as the noise region may be extracted as the region of interest (ROI).

Furthermore, the controller 130 may detect whether there is a revolving door from an image of the region of interest extracted in the step S904 (S906).

Here, the step S906 may be a step in which it is determined whether there is a revolving door in the region of interest through machine learning performed in advance. Alternatively, the step S906 may be a step of comparing information related to the shape features of a revolving door pre-stored in the storage unit 136 with shape features extracted from the acquired image, and determining whether there is a revolving door according to the comparison result.

Meanwhile, when it is determined that there is a revolving door in a region of interest as a result of the determination in the step S906, the controller 130 may proceed to the step S810 in FIG. 8 to detect static and dynamic features of the detected revolving door. However, as a result of the determination in the step S906, when it is not determined that there is a revolving door in the region of interest, the controller 130 may end the process of FIG. 9 that has been performed so far. Then, the process of FIG. 8 can be started again.

Meanwhile, in the step S906, a distance value detected from an image may be further considered as to whether there is a revolving door in the region of interest. In this case, when a region of interest is primarily extracted in the step S902, the controller 130 may secondarily extract a region that meets a predetermined distance condition from the extracted region of interest as a region of interest. In addition, whether there is a revolving door only in the secondly extracted region of interest through the determination according to machine learning or image recognition.

Therefore, even though the shape of a revolving door is included in the acquired image, when a distance between the delivery robot 100 and the revolving door exceeds a preset distance, the controller 130 determines that the revolving door is not included in the region of interest. The presence or absence of a revolving door with respect to an image of the revolving door at a location exceeding a preset distance may not be detected as described above, thereby preventing the unnecessary occurrence of the revolving door detection process.

Meanwhile, when it is determined in the step S906 that there is a revolving door in an image extracted as a region of interest, the controller 130 may proceed to the step S810 in FIG. 8 to detect the features of the revolving door from the image of the revolving door.

Figure 10:
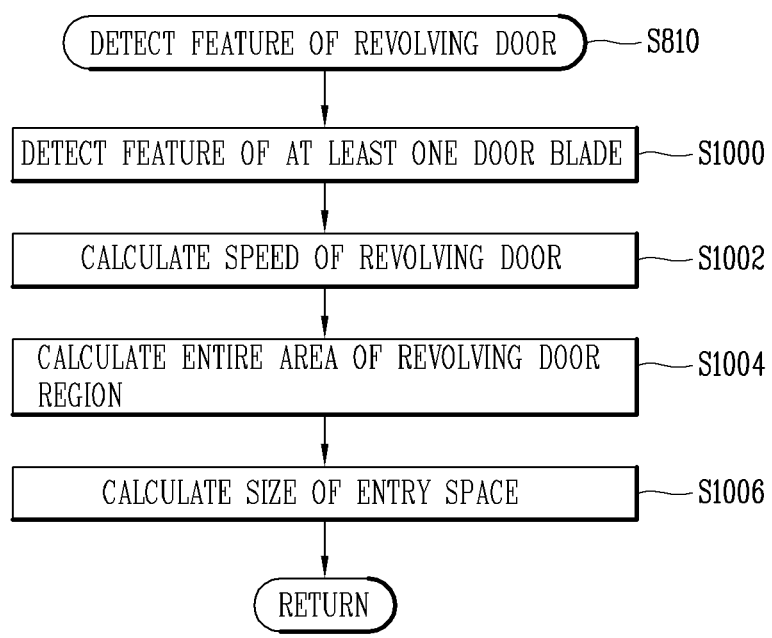
FIG. 10 is a flowchart more specifically illustrating an operation process of detecting a feature of a revolving door during the operation process of FIG. 8 according to an embodiment of the present disclosure.

On the other hand, FIG. 10 is a flowchart more specifically illustrating an operation process in the step S810 of detecting a feature of a revolving door during the operation process of FIG. 8.

First, in order to detect the features of the revolving door, the controller 130 may detect the features of at least one door rotating about a rotation shaft from an image of the revolving door in a region of interest (S1000). Here, the features of the at least one door may be a height of the door, a width of the door, and a pattern changed by rotation. Furthermore, the features of the door may be detected from an image of the front of the revolving door, that is, an entrance portion of the revolving door, acquired by the delivery robot 100 close thereto within a preset distance.

FIG. 11 is an example view illustrating an example of detecting a feature of at least one rotating door (hereinafter, a door blade) from an image of a revolving door acquired from an entrance portion of the revolving door as described above.

For convenience of description, it is assumed that the revolving door has one entrance and one exit, respectively, and the exit of the revolving door is disposed to be symmetrical with the entrance of the revolving door. In addition, it is assumed that the revolving door has four rotating door blades, and also assumed that the four door blades rotate at a constant speed counterclockwise at a constant speed $\omega$ about a rotation shaft.

An image of the revolving door 1110 acquired from the front of the revolving door 1110 may include an image of a rotation shaft 1111 and at least one door blade rotating about the rotation shaft 1111, and an outer wall 1100 surrounding the revolving door 1110. In this case, the features of a door blade that can be acquired through the image may be a size of the door blade.

However, due to the features of door blades disposed to rotate within a predetermined space, the height of each door blade may be constant. Accordingly, the size of the door blade acquired through an image may vary according to a distance L on the image from the rotation shaft 1111 to an edge of the door blade.

In this case, the distance L on the image from the rotation shaft 1111 to the edge of the door blade is, as shown in (a) of FIG. 11, may be greatest when an optical axis 1120 of the image sensor of the delivery robot 100 and the door blade are perpendicular to each other. In other words, as shown in (a) of FIG. 11, when a first door blade D1 of the door blades is at a location perpendicular to the optical axis 1120 of the image sensor, a distance L from the rotation shaft 1111 to an edge of the first door blade D1 may have a maximum value on the acquired image. Here, the distance on the image may denote an image acquired through the image sensor of the delivery robot 100, that is, a distance on a plane corresponding to a focal plane of the image sensor.

Meanwhile, since the door blades rotate about the rotation shaft 1111, the first door blade D1 may be rotated counterclockwise as time passes. Then, as shown in (b) and (c) of FIG. 11, the distance L on the image from the rotation shaft 1111 to the edge of the first door blade D1 according to the rotation of the first door blade D1 may be gradually reduced.

Furthermore, when the first door blade D1 is rotated to a location perpendicular to an optical axis of the image sensor of the delivery robot 100, as shown in (d) of FIG. 11, the distance L on the image up to the edge of the first door blade D1 may be zero. In this case, a distance on the image between another door blade different from the first door blade D1, that is, a second door blade D2, and the rotating shaft may be detected, and in this case, the distance on the image between the second door blade D2 and the rotation shaft may have a maximum value.

Meanwhile, the controller 130 may distinguish the first door blade D1 and the second door blade D2 from the features of the first door blade D1 and the second door blade D2, respectively. For an example, when a different post is attached to at least one of the plurality of door blades, each of the plurality of door blades may be distinguished based on the location and shape of the attached post, or at least one door blade may be distinguished from the other door blade. In this case, each of the plurality of door blades D1 to D4 or at least one distinguished door blade may be identified with different static features from those of other door blades.

In this case, the controller 130 may sense the rotation of the door blades based on any one identified door blade. Furthermore, a first time point t1 at which the distance L on the image from the edge of the door blade to the rotation shaft 1111 is the maximum based on any one identified door blade may be stored. Furthermore, a time period until a second time point t2 at which a static feature most similar to the static feature corresponding to the first time point t1 is detected again may be calculated as a time period in which the door blades rotate once, that is, a time period in which the revolving door 1110 rotates once.

For an example, when any one of the identified door blades is the first door blade D1, the controller 130 may store a time point at which the distance L on the image between the edge of the door blade D1 and the rotation shaft 1111 becomes the maximum as the first time point t1 as shown in (a) of FIG. 11. In addition, a static feature of the first door blade D1 at the first time point t1, that is, the distance L on the image between the edge of the first door blade D1 and the rotation shaft 1111, and a feature distinguishing the door blade D1 from other door blades (e.g., a location or size of a post attached to the first door blade D1, etc.) may be stored as the static feature of the first time point t1.

Furthermore, the controller 130 may continue to detect the static feature of the door blade through the acquired image, and determine whether the detected static feature is similar to the stored static feature of the first time point t1 by more than a preset level. In addition, when a static feature similar to the static feature of the first time point t1 by more than a preset level is detected, a time point at which the static feature is detected may be stored as the second time point t2.

Therefore, after the first time point t1 is stored, when the first door blade D1 rotates to move to a location perpendicular to an optical axis of the image sensor as shown in (a) of FIG. 11, the second time point t2 may be stored. Then, the controller 130 may detect a rotational speed ω of the revolving door 1110 based on the first time point t1 and the second time point t2, and a maximum value of the distance L on the image between the edge of the first door blade D1 and the rotation shaft 1111 (S1002).

In order to detect the rotational speed ω of the revolving door 1110 in the step S1002, the controller 130 may estimate a maximum value (Lmax) of a distance L on the image between an edge of the first door blade D1 and the rotation shaft 1111 as a radius of an inner region of the revolving door. In other words, the controller 130 may detect the rotational speed ω of the revolving door 1110 according to Equation 1 below.

$$\omega = \frac{2\pi L_{max}}{t_2 - t_1}$$ [Equation 1]

Here, ω denotes a rotational speed of the revolving door, Lmax denotes a maximum value on the distance L on the image between the edge of the identified first door blade and the rotational shaft of the revolving door, t1 denotes a first time point at which the Lmax is detected, and t2 denotes a second time point at which the Lmax is detected again after the first time point.

On the other hand, when the rotational speed of the revolving door 1110 is calculated in the step S1002, the controller 130 may first calculate a total area of an inner region of the revolving door 1110 to calculate a space between each door blade of the revolving door 1110 for the delivery robot 100 to enter (S1004). In this case, the total area of the inner area of the revolving door 1110 may be calculated as in Equation 2 below using the estimated radius of the inner region of the revolving door 1110, that is, the maximum value Lmax of the distance L on the image between the edge of the first door blade D1 and the rotation shaft 1111.

$$A = \pi (L_{max})^2$$ [Equation 2]

Here, A denotes an area of the inner region of the revolving door, and Lmax denotes a maximum value of the distance L on the image between the edge of the identified first door blade and the rotation shaft of the revolving door.

Meanwhile, when the total area of the inner region of the revolving door 1110 is calculated in the step S1004, the controller 130 may calculate a size of a space between each door blade based on the number of door blades of the revolving door 1110 (S1006). To this end, the controller 130 may first calculate the number of door blades of the revolving door 1110 based on a change pattern of the static feature of a door blade acquired from the image.

For an example, the controller 130 may calculate the number of door blades based on a change pattern of the distance L on the image between the edge of the door blade and the rotation shaft 1111. In other words, when at a location perpendicular to an optical axis of the image sensor of the delivery robot 100, the distance L on the image from an edge of the first door wing D1 to the rotation shaft 1111 may have a maximum value as shown in (a) of FIG. 11, and may gradually decrease as shown in (b) and (c) of FIG. 11. Furthermore, as shown in (d) of FIG. 11, when the first door blade D1 moves to a location horizontal to an optical axis direction of the image sensor of the delivery robot 100, the distance L on the image from the edge of the first door blade D1 to the rotation shaft 1111 may become zero while at the same time the distance on the image from an edge of another door blade, that is, the second door blade D2, and the rotation shaft 1111 may have a maximum value again. Accordingly, the distance L between an edge of a door blade and the rotation shaft that is detected from the door blade at one side closest to the rotation shaft 1111 may have a maximum value as shown in (a) of FIG. 11, and then may have a pattern in which the maximum value is detected again at the time point having the minimum value.

Meanwhile, the change pattern of the distance L may be repeated according to the number of door blades while the revolving door 1110 rotates once. In other words, in the case of the revolving door 1110 having four door blades as shown as an example in FIG. 11, a pattern is repeated four times in which the distance L gradually decreases from a time point at which the maximum value is detected while the revolving door 1110 rotates once, and the maximum value is detected again at a time point at which the minimum value is detected. In other words, based on the number of times the pattern is repeated and a time period in which the revolving door 1110 rotates once (a time difference between the second time point t2 and the first time point t1), the controller 130 may detect the number of door blades of the revolving door 1110.

On the other hand, when the number of revolving doors is detected as described above, the controller 130 may calculate a size of space between the door blades based on the detected number of revolving doors and a total area of the inner region of the revolving door 1110 calculated in the step S1004. For an example, as shown in Equation 3 below, the controller 130 may divide the total area of the inner region of the revolving door 1110 by the detected number of door blades to calculate a size of space between the door blades, that is, a size of the entry space for allowing the delivery robot 100 to enter.

$$S = \frac{A}{N}$$ [Equation 3]

Here, S denotes a size of the entry space, A denotes an area inside the revolving door, and N denotes the number of door blades.

On the other hand, in the above description, an example of detecting a change pattern of a size of a door blade based on a distance on the image from the rotation shaft and an edge of the door blade based on either one of the left and right sides about the rotation shaft 1111 and detecting the features of the revolving door accordingly has been described. Therefore, in a state where the delivery robot 100 is located at the left or right side of the front of the revolving door to allow the image sensor to direct either one of the left and right sides about the rotation shaft 1111, an example of detecting a rotational speed of the revolving door, a size of the inner region, the number of door blades, a size of the entry space, and the like has been described.

On the other hand, in a different method from the above-mentioned method, the features of the revolving door including a rotational speed of the revolving door, a size of the inner region, the number of door blades, and a size of the entry space can of course be detected.

For an example, as described above, the controller 130 may control a time period between a time point at which a maximum value of the distance (L) is detected according to a change of the distance (L) between the edge of the door blade and the rotation shaft and a time point at which a minimum value of the distance (L) is detected. In this case, assuming FIG. 11, a time point at which the door blade is rotated (a time point at which the distance L is the maximum) as shown in (a) of FIG. 11 and a time point at which the door blade is rotated (a time point at which the distance L is the minimum) as shown in (d) of FIG. 11 may be detected.

In this case, the time point at which the distance L has a maximum value is a time point at which the door blade is at a location perpendicular to the optical axis 1120 of the image sensor of the delivery robot 100 as shown in (a) of FIG. 11 regardless of the number of door blades, and the time point at which the distance L has a minimum value is a time point at which the door blade is located in a direction in parallel to the optical axis 1120 of the image sensor of the delivery robot 100 as shown in (d) of FIG. 11.

In other words, as shown in (a) of FIGS. 11 and (d) of FIG. 11, a time period between a time point at which the distance L between the edge of the door blade and the rotation shaft has a maximum value and a time point at which the distance L has a minimum value may be a time period that is required for the door blade to rotate by 90 degrees. Accordingly, the time period between the time point at which the distance L has a maximum value and the time point at which the distance L has a minimum value may vary depending on the rotational speed of the revolving door 1110, that is, the number of revolutions per minute.

Meanwhile, information on a time period required to rotate the door blade by 90 degrees for each number of revolutions per minute of the revolving door, that is, a time period required for the door blade to rotate 90 degrees according to an angular speed for each number of revolutions per minute of the revolving door may be stored in the storage unit 136. This information is information measured or calculated in advance by a plurality of experiments performed in connection with the present disclosure, and may be information stored in advance by the manufacturer when the delivery robot 100 is released.

Accordingly, the controller 130 may calculate a time difference between the time point at which the distance L has a maximum value and the time point at which has a minimum value, and estimate the number of revolutions per minute of the revolving door based on the calculated time difference and information stored in the storage unit 136.

Furthermore, based on the estimated number of revolutions per minute, a time period required for the revolving door to rotate once, that is, one revolution time period.

Meanwhile, as described above, during one rotation of the revolving door 1110, the distance (L) between the edge of the door blade and the rotation shaft gradually decreases at a time point at which the maximum value is detected, and a pattern in which the minimum value is detected and then the maximum value is detected can be repeated. In addition, as the number of door blades increases, the number of times the pattern of increasing and decreasing the distance L is repeated during one rotation of the revolving door 1110 may increase.

For example, as shown in FIG. 11, in the case of the revolving door 1110 having four door blades, an increase and decrease pattern of the distance (L) between the edge of the door blade and the rotation shaft during one rotation of the revolving door 1110 may be repeated four times. Furthermore, in the case of a revolving door having three door blades, the increase and decrease pattern of the distance (L) between the edge of the door blade and the rotation shaft during one rotation of the revolving door may be repeated three times. Alternatively, in the case of a revolving door having two door blades, the increase and decrease pattern of the distance (L) between the edge of the door blade and the rotation shaft during one rotation of the revolving door may be repeated twice. In other words, when a time period in which the increase and decrease pattern of the distance L is made once is repeated four times (four door blades), three times (three door blades), or twice (two door blades), a time period in which the revolving door rotates once may be calculated.

Therefore, the controller 130 may calculate time periods for one rotation of the revolving door corresponding to cases where the number of door blades are four, three, and two according to values obtained by multiplying a time period in which the increase and decrease pattern of the distance (L) between the edge of the door blade and the rotation shaft is made once by four, three, and two, respectively. Furthermore, the controller may estimate the number of blades of the revolving door based on any one of the calculated rotation time periods, which is similar to one rotation time of the revolving door calculated based on the number of revolutions per minute by more than a preset level. In addition, a time period for one rotation of the revolving door may be determined according to the estimated number of door blades of the revolving door.

In this case, the determined one rotation time period of the revolving door may be a value corresponding to a time difference between the second time point t2 and the first time point t1 in Equation 1 above. Therefore, it may be used instead of the time difference between the second time point t2 and the first time point t1 to calculate the rotational speed of the revolving door from Equation 1. In addition, the calculated number of door blades may be used to calculate a size of the entry space in Equation 3 above.

On the other hand, in the above description, an example of calculating the number of door blades, a rotation speed of the revolving door, a size of the inner region of the revolving door, and a size of the entry space, and the like has been described based on a feature detected from a door blade at either one of the left and right sides about the rotation shaft of the revolving door has been described, but on the contrary, the feature of the revolving door may also be detected using a correlation between the features of the door blades detected from the left and right sides about the rotating shaft of the revolving door.

For ab example, the delivery robot 100 may detect both image changes of the door blades at the left and right sides about the rotation shaft using one or more image sensors. In addition, the features of the revolving door may be detected according to the detected result. FIGS. 12 to 15 illustrate an example of detecting the number of door blades of a revolving door based on a correlation between features detected from the images of the door blades at the left and right sides about the rotation shaft as described above.

Meanwhile, in order to detect both image changes of the door blade at the left and right sides about the rotation shaft 1111, the delivery robot 100 may be located at a location that directs the rotation shaft of the revolving door at the center of an entrance of the revolving door. Furthermore, the images of the door blades at the left and right sides about the rotation shaft may be acquired using at least one image sensor. Accordingly, in the following description, it will be assumed that the delivery robot 100 is located in a direction that directs the rotation shaft at the center of the entrance of the revolving door.

On the other hand, the sensing unit 134 may detect the features of the door blades at the left and right sides about the rotation shaft from an image captured around the rotation shaft. Alternatively, the features of the door blades at the left and right sides about the rotation shaft may be detected based on images respectively acquired from a first sensor that senses an image at the left side of the rotation shaft and a second sensor that senses an image at the right side of the rotation shaft.

Figure 12:
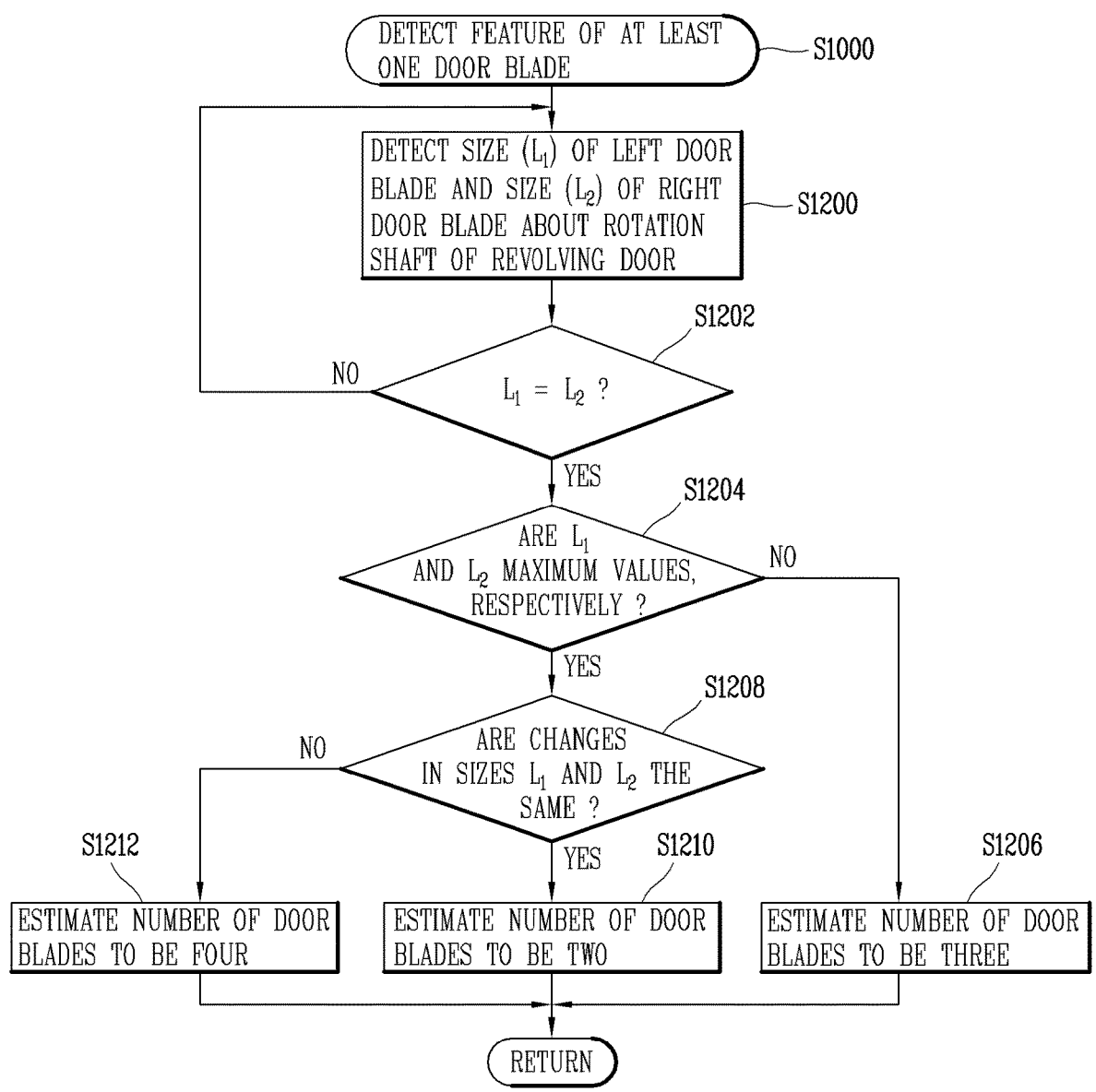
FIG. 12 is a flowchart illustrating an operation process of detecting the number of door blades based on a feature of door blades on left and right sides of a rotation shaft of a revolving door according to an embodiment of the present disclosure.

First, FIG. 12 is a flowchart illustrating an operation process of detecting the number of door blades based on a correlation between the features of the door blades at the left and right sides about the rotation shaft.

Referring to FIG. 12, the controller 130 of the delivery robot 100 according to an embodiment of the present disclosure may detect a size of the left door blade, that is, a first distance (L1) on the image from an edge of the left door blade to the rotation shaft, and a size of the right door blade, that is, a second distance (L2) on the image from an edge of the right door blade to the rotation shaft, about the rotation shaft of the revolving door. Furthermore, it may be determined whether the detected first distance L1 and the second distance L2 are the same (S1202). In addition, when the detected first distance L1 and the second distance L2 are the same, it may be detected whether the first distance L1 and the second distance L2 each have a maximum value (S1204).

Furthermore, when the first distance L1 and the second distance L2 are the same, in a case where the first distance L1 and the second distance L2 do not each have a maximum value, it may be determined that the revolving door has three door blades (S1206).

Meanwhile, as a result of the determination in the step S1204, at a time point at which the first distance L1 and the second distance L2 are the same, in a case where the first distance L1 and the second distance L2 each have a maximum value, the controller 130 may detect whether size change patterns of the first distance L1 and the second distance L2 are the same (S1208). In addition, the number of door blades may be estimated to be two (S1212) or four (S1210) based on the detection result of the size change patterns in the step S1208.

For an example, according to the foregoing description, the distance (L) from the edge of the door blade to the rotation shaft may have a maximum value when the door blade is located in a direction perpendicular to an optical axis of the image sensor of the delivery robot 100, and the distance L from the edge of the relevant door blade to the rotation shaft may have a minimum value "0" when the door blade is located along a direction parallel to the optical axis of the image sensor.

Therefore, referring to FIG. 13 that illustrates a revolving door 1300 having three door blades, as shown in (a) of FIG. 13, when a door blade (first door blade D1) at a left side of the rotation shaft 1111 is rotated to move to a location perpendicular to an optical axis 1320 of the image sensor of the delivery robot 100, a distance (first distance L1) from the rotation shaft 1111 to an edge of the left door blade may have a maximum value.

However, when the first distance L1 from the rotation shaft 1111 to the edge of the left door blade has a maximum value, a second distance L2 from the rotation shaft 1111 to an edge of the right door blade may have a value smaller than the maximum value as shown in (a) of FIG. 13. Therefore, the first distance L1 and the second distance L2 may have different values, and accordingly, the controller 130 may proceed to the step S1200 again as a result of the determination in the step S1202 of FIG. 12 to detect the distance L1 and the second distance L2 again.

On the other hand, in the case of the revolving door 1300 having three door blades, an angle between the door blades is defined to form 120 degrees. Therefore, as the revolving door 1300 rotates, as shown in (b) of FIG. 13, when the door blade (first door blade D1) at a left side of the rotation shaft 1111 and a door blade (third door blade D3) at a right side thereof each move to a location forming 60 degrees with respect to the rotation shaft 1111, a distance (first distance L1) from the rotation shaft 1111 to an edge of the first door blade D1 and a distance (second distance L2) from the rotation shaft 1111 to an edge of a third door blade D3 may have the same value. Accordingly, at a time point at which the first distance L1 and the second distance L2 are the same as a result of the determination in the step S1202 of FIG. 12, the controller 130 may proceed to the step S1204 to determine whether the first distance L1 and the second distance L1 each have a maximum value.

However, as shown in (b) of FIG. 13, when the first door blade D1 and the third door blade D3 each are located at a location forming 60 degrees with respect to the rotation shaft 1111, an internal angle between the first door blade D1 and the third door blade D3, and the optical axis 1320 of the image sensor may be less than or greater than 90 degrees. Therefore, as shown in (b) of FIG. 13, the distance (first distance L1) between an edge of the door blade D1 at a left side of the rotation shaft 1111 and the rotation shaft 1111, and the distance (second distance L2) between an edge of the door blade D3 at a right side of the rotation shaft 1111 and the rotation shaft 1111 may have values smaller than the maximum value, respectively.

Here, the door blade at the left side of the rotation shaft 1111 may be a door blade closest to the delivery robot 100 among the door blades at the left side of the rotation shaft 1111, and the door blade at the right side of the rotation shaft 1111 may be a door blade closest to the delivery robot 100 among the door blades at the right side of the rotation shaft 1111.

Therefore, as shown in (b) of FIG. 13, in the revolving door 1300 having three door blades, when the first distance L1 and the second distance L2 have the same value, the values of the first distance L1 and the second distance L2 may have values smaller than the maximum value by more than a preset level. For example, the value of the first distance L1 may be smaller than that of the first distance L1 detected in (a) of FIG. 13.

Therefore, the controller 130 may determine that the first distance L1 and the second distance L2 are not each a maximum value as a result of the determination in the step S1204 of FIG. 12, and accordingly may proceed to the step S1206 to determine that the number of door blades of the revolving door 1300 is three.

Meanwhile, when the door blades rotate, the first distance L1 may have a continuously decreasing pattern, and the second distance L2 may have a continuously increasing pattern. Furthermore, when the third door blade D3 passes through a location perpendicular to the optical axis 1320 of the image sensor, a distance from an edge of the door blade at the right side of the rotation shaft 1111 to the rotation shaft 1111, that is, the second distance L2, may have a maximum value. Furthermore, the second distance L2 may be gradually reduced. Furthermore, when the first door blade D1 passes through a location parallel to the optical axis 1320 of the image sensor, a distance from an edge of the door blade at the left side of the rotation shaft 1111 and the rotation shaft 1111, that is, the first distance L1, may be zero.

Meanwhile, subsequent to a time point at which the first distance L1 becomes zero, the door blades at the left and right sides of the rotation shaft 1111 may be changed. In this case, the door blade at the left side of the rotation shaft 1111 closest to the delivery robot 100 may be the second door blade D2, and the door blade at the right side of the rotation shaft 1111 closest to the delivery robot 100 may be the first door blade D1. Furthermore, the first distance L1 and the second distance L2 may be detected again according to a distance on the image between an edge of the second door blade D2 and the rotation shaft 1111 and a distance on the image between an edge of the first door blade D1 and the rotation shaft 1111.

On the other hand, FIG. 14 is illustrated on the assumption that the number of door blades is four.

First, referring to (a) of FIG. 14, it is assumed that the first door blade D1 and the third door blade D3 are each moved to a location perpendicular to the optical axis 1320 of the image sensor of the delivery robot 100 according to the rotation of the revolving door 1400. In this case, the fourth door blade D4 may be in a state in which a distance between an edge of the door blade and the rotation shaft 1111 is zero as a location parallel to the optical axis 1320 of the image sensor.

Accordingly, the controller 130 may detect a distance on the image between an edge of the first door blade D1 and the rotation shaft 1111 as a distance (first distance L1) between an edge of the door blade at a left side of the rotation shaft 1111 and the rotation shaft 1111, and may detect a distance on the image between an edge of the third door blade D3 and the rotation shaft 1111 as a distance (second distance L2) between an edge of the door blade at a right side of the rotation shaft 1111 and the rotation shaft 1111.

On the other hand, as shown in FIG. 14, in the case of a revolving door 1400 having four door blades, an angle between each door blade may form 90 degrees. Therefore, as shown in (a) of FIG. 14, when any one door blade D4 is parallel to the optical axis 1320 of the image sensor, the other two door blades D1, D3 may be located at a location perpendicular to the optical axis 1320 of the image sensor. Accordingly, the distance (first distance L1) between an edge of the first door blade D1 and the rotation shaft 1111 perpendicular to the optical axis 1320 of the image sensor and the distance (second distance L2) between an edge of the third door blade D3 and the rotation shaft 1111 may be the same, and also may have a maximum value.

Therefore, the first distance L1 and the second distance L2 may have a maximum value at a time point at which the first distance L1 and the second distance L2 detected in the step S1200 of FIG. 12 are the same (step S1202 of FIG. 12). Accordingly, the controller 130 may proceed from the step S1204 to the step S1208 of FIG. 12 to compare the change patterns of the first distance L1 and the second distance L2.

Meanwhile, referring to FIG. 14, when the revolving door 1400 rotates, the fourth door blade D4 may be rotated. Accordingly, as the fourth door blade D4 moves to a location that is not parallel to the optical axis 1320 of the image sensor, the door blade at the right side of the rotation shaft 1111 detected through the image may be changed. In other words, as shown in (b) of FIG. 14, a door blade at the left side of the rotation shaft 1111 closest to the delivery robot 100 may still be the first door blade D1, but the door blade at the right side of the rotation shaft 1111 closest to the delivery robot 100 may be changed from the third door blade D3 to the fourth door blade D4. Accordingly, the controller 130 may detect a distance on the image between an edge of the fourth door blade D4 and the rotation shaft 1111 as a distance (second distance L2) between an edge of the door blade at the right side of the rotation shaft 1111 and the rotation shaft.

Therefore, as shown in (b) and (c) of FIG. 14, the first distance L1 may gradually decrease from the maximum value ((a) of FIG. 14). On the contrary, after the maximum value is detected in (a) of FIG. 14, the second distance L2 decreases to a value close to the minimum value "0" and then gradually increases according to a change (changed from D3 to D4) of the door blade at the right side of the rotation shaft 1111.

Meanwhile, since the first distance L1 decreases and the second distance L2 increases as described above, the change patterns of the first distance L1 and the second distance L2 may be opposite to each other. Accordingly, the controller 130 may determine that size changes of the first distance L1 and the second distance L2 are different from each other in the step S1208 of FIG. 12. Accordingly, the controller 130 may proceed to step S1212 to estimate that the number of door blades of the revolving door 1400 is four.

Meanwhile, as described above, since the change patterns of the first distance L1 and the second distance L2 are opposite, it may occur a point at which the first distance L1 and the second distance L2 become the same during a change of the first distance L1 and the second distance L2. Furthermore, in a case where the detection of the step S1200 is started at this time point, the controller 130 may determine that the first distance L1 and the second distance L2 are the same in the step S1202.

In this case, in order to prevent erroneous determination as a revolving door having three door blades by proceeding to the step S1206 of FIG. 12, the step S1202 may further include a step of determining whether the values of the first distance L1 and the second distance L2 have values above a predetermined level. In other words, the step S1202 of FIG. 12 may be a step of determining whether the values of the first distance L1 and the second distance L2 are the same only when the values of the first distance L1 and the second distance L2 are values above a preset size (e.g., above 70% of the maximum value) based on the maximum value, respectively In this case, even though the values of the first distance L1 and the second distance L2 are the same, in a case where the size is less than 70% of the maximum value, the controller 130 proceeds to the step S1200 again to detect the values of the first distance L1 and the second distance L2 again.

On the other hand, FIG. 15 assumes an example in which the number of door blades is two. Referring to FIG. 15, when the number of door blades is two, the first door blade D1 and the second door blade D2 may be configured to have an internal angle of 180 degrees as shown in (a) of FIG. 15. Therefore, as shown in (a) of FIG. 15, when the first door blade D1 and the second door blade D2 are each located in a direction perpendicular to the optical axis 1320 of the image sensor, a distance (first distance L1) on the image between an edge of the door blade D1 at a left side of the rotation shaft 1111 and the rotation shaft 1111, and a distance (second distance L2) on the image between an edge of the door blade D2 at a right side of the rotation shaft 1111 and the rotation shaft 1111 may each be the same, and may each have a maximum value.

Accordingly, the controller 130 may proceed to the step S1208 of determining whether the change patterns of the first distance L1 and the second distance L2 are the same according to the determination result of the steps S1202 and S1204 in FIG. 12.

On the other hand, as shown in FIG. 15, in the case of a revolving door 1500 having two door blades, since the first door blade D1 and the second door blade D2 form an angle between each other of 180 degrees, and during the rotation of the revolving door 1500, the second distance L2 may decrease while at the same time the first distance L1 decreases, and the second distance L2 may increase while at the same time the first distance L1 increases as shown in (b) of FIG. 15. Accordingly, in the step S1208 of FIG. 12, the controller 130 may determine that the change patterns of the first distance L1 and the second distance L2 are the same, and proceed to the step S1210 according to the determination result of the step S1208 to estimate that the number of door blades of the revolving door 1500 is two.

On the other hand, in the case of the revolving door 1500 having two door blades, as shown in (c) of FIG. 15, the first and second door blades D1, D2 may rotate to move to a location parallel to a direction of the optical axis 1320 of the image sensor. In this case, the controller 130 may determine that both the first distance L1 and the second distance L2 have a value of zero. On the other hand, a case where both the first distance L1 and the second distance L2 have a value of zero during the rotation of the revolving door as described above may only include a case where the number of door blades is two, and therefore, the number of blades of the revolving door may, of course, be determined to be four or two according to whether there is a case where the both values of the first distance L1 and the second distance L2 have zero, that is, a case where the both values thereof have values close to zero in consideration of an error or noise, or a case where both the first distance L1 and the second distance are not detected.

In other words, the step S1208 of FIG. 12 may be replaced with a step of detecting whether there is a case where both the first distance L1 and the second distance L2 become zero or neither are detected within a preset time. In this case, when it is detected a case where both the first distance L1 and the second distance L2 become zero (or neither are detected) within the preset time period, the controller 130 may proceed to the step S1210 to estimate the number of door blades to be two, and otherwise, proceed to the step S1212 to estimate that the number of door blades is four.

On the other hand, when the number of blades of the revolving door is estimated as illustrated in FIGS. 12 to 15, the controller 130 may detect a pattern in which the first distance L1 or the second distance L2 is repeated. Furthermore, a time period required for one pattern among the repeated patterns is detected, and the time period required for the detected one pattern is multiplied by the estimated number of door blades to detect a time period in which the revolving door rotates once.

In this case, the detected one rotation time period of the revolving door may be a value corresponding to a time difference between the second time point t2 and the first time point t1 in Equation 1 above. Therefore, it may be used instead of the time difference between the second time point t2 and the first time point t1 to calculate the rotational speed of the revolving door from Equation 1. In addition, the estimated number of door blades may be used to calculate a size of the entry space in Equation 3 above.

Meanwhile, when a size of the entry space is calculated through the process described in FIG. 10, the controller 130 may set a current location of the delivery robot 100 to an initial location, and determine a space to enter based on the calculated rotational speed ω of the revolving door, a size S of the entry space, a location of the revolving door and a distance to the entrance of the revolving door, a size A of the inner region of the revolving door, and a size and a maximum driving speed V of the delivery robot 100 in the step S820 of FIG. 8. Here, the entry space may be any one space among inner regions of the revolving door divided by the door blades of the revolving door.

Furthermore, when the entry space is determined, the controller 130 may determine an entry location for the robot to enter into the determined entry space, and generate an entry path based on the rotational speed of the revolving door. In addition, at an entry time point at which the delivery robot 100 enters the entry space along the entry path, the controller 130 may determine an entry speed of the delivery robot 100 by reflecting a distance to the revolving door for the delivery robot 100 to enter into the revolving door. Furthermore, the drive unit 137 for allowing the delivery robot 100 to drive through the entry path may be performed by controlling an entry into the inner region of the revolving door.

Meanwhile, the entry location may be a location at which the delivery robot 100 does not collide with the rotating door blades. In other words, the entry location as a location at which the door blades adjacent thereto are farthest away from the delivery robot 100 may be a central location of a region between the door blade and the other door blade. furthermore, when the entry space and the entry location are determined, the controller 130 may determine an entry time point to enter the entry location.

In this case, as shown in (b) of FIG. 13, the controller 130 may determine a time point at which the center of the region between the door blade and the other door blade is located at the center of the entrance of the revolving door 1300 as the entry time point. Therefore, the controller 130 may estimate a time point at which the currently determined entry space is located at the center of the entrance of the revolving door 1400 based on the rotational speed of the revolving door as the entry time point, and calculate a driving time for the delivery robot 100 to drive to the entry location based on a distance between the revolving door 1400 and the delivery robot 100 and the determined entry speed.

Alternatively, on the other hand, since the revolving door continues to rotate, when the delivery robot 100 enters at a time point at which a center point of the entry space 1600 is located at the center of the entrance of the revolving door 1400, a time point at which the delivery robot 100 actually moves into an entry space 1600 may be a time point at which the center of the entry space 1600 passes through the center of the entrance of the revolving door 1400. Accordingly, the controller 130 may, of course, determine the entry time prior to a time point at which the center of the entry space 1600 reaches the center of the entrance of the revolving door 1400.

Furthermore, a current rotational state of the revolving door may be detected based on the number of door blades and a change pattern of a size of at least one door blade of the revolving door, and a standby time until the determined entry space reaches the entry location may be calculated based on the current rotational state. In addition, when the calculated standby time is greater than the driving time, the drive unit 137 may be controlled such that the delivery robot 100 starts to enter along the entry path based on the entry speed after a time period corresponding to a difference between the calculated standby time and driving time has passed.

Meanwhile, when the calculated standby time is less than the calculated driving time, the controller 130 may stand by for the revolving door to rotate one more turn. In this case, after the entry space passes the entry location, the controller 130 may calculate the standby time and the driving time again. In this case, since the standby time has a maximum value, it may have a value greater than the driving time.

Meanwhile, when the calculated standby time is less than the calculated driving time, the controller 130 may further increase the entry speed. Furthermore, the driving time may be calculated again. In this case, the recalculated driving time may be shorter, and accordingly, may have a value smaller than the calculated standby time. Then, the controller 130 may control the drive unit 137 such that the delivery robot 100 starts to enter based on the entry speed along the generated entry path after a time period corresponding to a difference between the calculated standby time and the driving time has passed.

On the other hand, FIG. 16 is an example view illustrating an example in which the delivery robot 100 enters a region of the revolving door and leaves the region of revolving door based on the calculated entry space and the rotational speed of the revolving door 1400. For convenience of description, the entrance and exit of the revolving door 1400 are each one, and it is assumed that the exit of the revolving door 1400 is located in a direction symmetrical to the entrance of the revolving door 1400.

As described above, the controller 130 may determine one of the regions inside the revolving door divided by the door blades as the entry space 1600 for the delivery robot 100 to enter. In addition, an entry location and an entry time point may be determined according to the determined entry space 1600, and an entry path may be generated according to the determined entry time point. Part (a) of FIG. 16 shows an example in which an entry path is generated.

On the other hand, as described above, the controller 130 may determine an entry start time point of the delivery robot 100 based on a distance to the revolving door 1400 and a rotational speed of the revolving door 1400 to allow the delivery robot 100 to enter at an optimal location of the entry space 1600, that is, when the entry space 1600 is located (entry time point). Then, driving along the entry path may be started at the determined entry start time point. Accordingly, as shown in (b) of FIG. 16, the entry into the entry space 1600 may be carried out at the entry time point (a time point at which the entry space is located at an optimal entry location).

On the other hand, when the entry into the inner region of the revolving door, that is, the entry space 1600, is successfully carried out, the controller 130 may detect separation distances between the door blades D1, D4 adjacent thereto and the outer wall 1100, and the delivery robot 100 so as not to collide with the other door blades and the outer wall 1100 of the revolving door 1400 in the entry space 1600 as shown in (c) of FIG. 16, and control the delivery robot 100 to drive based on the detected separation distances and the rotational speed of the revolving door 1400. In this case, the controller 130 may perform driving control to maintain the separation distances between each of the door blades and the outer wall 100, and the delivery robot 100 above a predetermined minimum separation distance.

On the other hand, as shown in (c) of FIG. 16, while driving in a region inside the revolving door, the controller 130 may determine a location at which the delivery robot 100 starts to enter, that is, a departure point symmetrical to a starting point about the center of the revolving door, that is, the rotation shaft. In addition, a departure path to the departure point may be generated by reflecting the rotational speed of the revolving door. Part (d) of FIG. 16 shows an example in which such a departure path is defined.

In this case, the controller 130 may continuously update the location of the delivery robot 100 by a method such as dead reckoning while driving inside the revolving door. Furthermore, a departure path connecting the departure point and a current location of the delivery robot 100 may be generated. Furthermore, when the departure point and the current location of the delivery robot 100 are close to within a preset range, a departure path for departure from the revolving door region may be generated.

In this case, when the departure path collides with the rotating door blade, the controller 130 may continue driving control in a region inside the revolving door as shown in (c) of FIG. 16. On the contrary, as shown in (d) of FIG. 16, when the generated departure path does not collide with the rotating door blade, the drive unit 137 may be controlled to allow the delivery robot 100 to drive along the departure path. Accordingly, the delivery robot 100 may leave the region inside the revolving door.

Meanwhile, when entering the entry space 1600, the controller 130 may calculate a time period in which the location of the entry space 1600 is changed by above a preset angle based on the rotational speed of the revolving door. For example, the controller 130 may calculate a time period tin which the location of the entry space is changed by 100 degrees (assuming that the preset angle is 100 degrees) based on the calculated rotational speed of the revolving door. In addition, the controller 130 may determine the departure time point and the departure path of the revolving door based on the entry time point and the calculated time period t. Here, the departure time point of the revolving door and the departure path denote a moving path according to an exit time point of the revolving door and an exit of the revolving door for a process of allowing the delivery robot to enter the building and exit the building. Therefore, determining the departure time point of the revolving door and departure path based on the entry time point and the calculated time period t denotes determining a movement path according the exit time point of the revolving door and the exit based on the entry time point and the calculated time period t.

Alternatively, the controller 130 may detect the exit of the revolving door through image recognition or deep learning image recognition. For an example, the controller 130 may detect a distance D between an edge of the front door blade D4 and the outer wall surrounding the revolving door through the image recognition or the deep learning image recognition. Furthermore, whether the rotating door blade collides with the delivery robot 100 while driving along the departure path may be determined based on whether the detected distance D is above a preset distance. In other words, when the detected distance D is below a preset distance, the controller 130 may determine that the delivery robot 100 may collide with the rotating door blade while driving along the departure path. On the contrary, when the detected distance D exceeds a preset distance, the controller 130 may determine that the delivery robot 100 may not collide with the rotating door blade while driving along the departure path.

Here, the preset distance may be a distance determined according to a size of the delivery robot 100. For example, the preset distance may be a distance corresponding to the size of the delivery robot 100, for example, a width of the delivery robot 100. Alternatively, the preset distance may have a length shorter than a distance corresponding to the width of the delivery robot 100 by a predetermined level. For an example, the preset distance may have a length corresponding to 80% of the distance corresponding to the width of the delivery robot 100. This is because, due to the features of the automatically rotating revolving door, the distance D between the front door blade D4 and the outer wall surrounding the revolving door may increase while the delivery robot 100 drives along the departure path. In this case, the preset distance may be determined more variably according to the rotational speed of the revolving door.

The present disclosure described above may be implemented as computer-readable codes on a program-recorded medium. The computer readable medium includes all types of recording devices in which data readable by a computer system is stored. Examples of the computer-readable medium may include a hard disk drive (HDD), a solid state disk (SSD), a silicon disk drive (SDD), a ROM, a RAM, a CD-ROM, a magnetic tape, a floppy disk, an optical data storage device and the like, and may also be implemented in the form of a carrier wave (e.g., transmission over the Internet). Accordingly, the detailed description thereof should not be construed as restrictive in all aspects but considered as illustrative. The scope of the present disclosure should be determined by rational interpretation of the appended claims, and all changes within the scope of equivalents of the present disclosure are included in the scope of the present disclosure.

What is claimed is:

1. A delivery robot comprising:
a sensing part including at least one image sensor;
a drive part configured to move a main body of the delivery robot; and
a controller configured to:
detect a revolving door from an image in front of the delivery robot acquired from the at least one sensor,
detect a feature of at least one door blade of a revolving door rotating around a rotation shaft from the image,
detect a feature of the revolving door including at least one of a rotational speed of the revolving door, a size of a region inside the revolving door, and a number of door blades of the revolving door based on the feature of the at least one door blade,
generate an entry path including an initial location of the delivery robot and an entry time point for entering into the revolving door,
generate a departure path including a departure time point and a departure point for exiting from the revolving door based on the feature of the revolving door or the feature of the at least one door blade, and
control the drive part to move the delivery robot along the entry path and the departure path to pass through the revolving door.

2. The delivery robot of claim 1, wherein the controller is further configured to:
identify any one of the door blades of the revolving door that is distinguishable from other door blades as an identified any one door blade, and
detect the rotational speed of the revolving door and the number of door blades of the revolving door based on a change in a distance on the image between an edge of the identified any one door blade and the rotation shaft.

3. The delivery robot of claim 2, wherein the controller is further configured to:
detect one or more static features of each door blade among the door blades calculated based on a width of the each door blade calculated based on a distance on the image having a maximum value when a distance on the image between an edge of the each door blade and the rotation shaft has the maximum value, and a shape of the each door blade, and
identify any one of the door blades based on the one or more static features.

4. The delivery robot of claim 2, wherein the controller is further configured to:
calculate a time period for one rotation of the revolving door based on a time difference between a first time point corresponding to a feature of the identified any one door blade and a second time point at which the feature of the identified any one door blade is detected again after the first time point, and
calculate the rotational speed of the revolving door and the number of door blades of the revolving door based on the time period for the one rotation and a distance on the image between an edge of the identified any one door blade and the rotation shaft.

5. The delivery robot of claim 4, wherein the controller is further configured to:
calculate a size of an inner region of the revolving door based on the distance on the image between the edge of the identified any one door blade and the rotation shaft, and
calculate a size of an entry space for allowing the delivery robot to enter into the revolving door based on the size of the inner region of the revolving door and the number of door blades of the revolving door.

6. The delivery robot of claim 1, further comprising:
a storage device including information on a time period required for the revolving door to rotate by a preset angle based on an angular speed for each number of revolutions per minute of the revolving door,
wherein the controller is further configured to:
calculate a time difference between a time point at which a distance on the image between the edge of the door blade at either one of left and right sides of the rotation shaft has a maximum value and a time point at which the distance on the image between the edge of the door blade at the either one of left and right sides of the rotation shaft has a minimum value,
calculate a number of revolutions per minute of the revolving door based on information on the time difference and the required time period,
calculate estimated required time periods for each one rotation of revolving doors having different door blades according to a number of times a change pattern of the distance on the image between the edge of the door blade and the rotation shaft is repeated at either one of the left and right sides of the rotation shaft, and estimate the number of door blades of the revolving door based on any one of the estimated required time periods corresponding to a time period required for one rotation of the revolving door calculated based on the number of revolutions per minute.

7. The delivery robot of claim 1, wherein the controller is further configured to:

detect a first distance between an edge of a door blade at a left side of the rotation shaft and the rotation shaft, and a second distance between an edge of a door blade at a right side of the rotation shaft and the rotation shaft, determine that the revolving door has three door blades according to whether the first and second distances have a maximum value at a time point at which the first and second distances become equal, and in response to determining that the revolving door does not have three door blades, determine that the number of door blades of the revolving door is two or four based on a change pattern of the first and second distances.

8. The delivery robot of claim 7, wherein the controller is further configured to:

determine whether the first and second distances have the maximum value based on whether the first and second distances have a value above a preset ratio with respect to a maximum value of each of the first and second distances at the time point at which the first and second distances become the equal.

9. The delivery robot of claim 7, wherein the controller is further configured to:

determine that the number of door blades of the revolving door is two or four based on when both the first and second distances have a value close to or approximately equal to zero, or when both the first and second distances are not detected when the revolving door is determined not have three door blades.

10. The delivery robot of claim 1, wherein the controller is further configured to:

extract a partial region as a region of interest from image information acquired from the at least one image sensor based on an angle directed by the image sensor and distance information included in the image information, and detect whether the revolving door is present within the extracted region of interest.

11. The delivery robot of claim 1, wherein the controller is further configured to:

determine any one space divided by each door blade of the revolving door as an entry space for the delivery robot to enter, detect a location of the entry space based on the rotational speed of the revolving door, and generate the entry path for the delivery robot to enter into the entry space based on location of the entry space.

12. The delivery robot of claim 11, wherein the controller is further configured to:

calculate a time period in which the location of the entry space is changed to be greater than a preset angle based on the rotational speed of the revolving door, and generate the departure path based on the time period.

13. The delivery robot of claim 11, wherein the controller is further configured to:

determine an entry speed based on a time period when the entry space moves to a preset entry location according to the rotational speed of the revolving door and a distance between the revolving door and the delivery robot.

14. The delivery robot of claim 13, wherein a center point of the preset entry location corresponds to a center point of an entrance of the revolving door.

15. The delivery robot of claim 1, wherein the controller is further configured to:

detect separation distances between door blades of the revolving door around the delivery robot and an outer wall surrounding the revolving door and the delivery robot, and control the drive part to move the delivery robot based on the separation distances and the rotational speed of the revolving door when the delivery robot is in a region inside the revolving door.

16. The delivery robot of claim 1, wherein the controller is further configured to:

define a departure point at a point symmetrical to the initial location of the delivery robot at which the delivery robot starts to enter into the revolving door about the rotation shaft.

17. The delivery robot of claim 1, wherein the controller is further configured to:

continuously update a location of the delivery robot when driving in an inner region of the revolving door to generate an updated location of the delivery robot, generate the departure path connecting the departure point and the updated location when the updated location and the departure point are approximately within a preset range, and control the drive part to move the delivery robot along the departure path based on whether the departure path collides with the rotating door blade.

18. The delivery robot of claim 17, wherein the controller is further configured to:

detect a distance between an edge of a door blade in front of the delivery robot and an outer wall surrounding the revolving door, and determine whether to collide with the door blade when driving along the departure path based on whether the distance between the edge of the door blade in front of the delivery robot and the outer wall is greater than a preset distance.

19. The delivery robot of claim 18, wherein the preset distance is determined based on a size of the delivery robot.

20. A method for controlling a delivery robot, the method comprising:

detecting, by a sensing part including at least one image sensor, a revolving door located in front of the delivery robot based on at least one image acquired through at least one image sensor;

detecting, by a controller in the delivery robot, a feature of at least one door blade of the revolving door that rotates about a rotation shaft from the at least one image;

detecting, by the controller, a feature of the revolving door including at least one of a rotational speed of the revolving door, a size of a region inside the revolving door, and a number of door blades of the revolving door based on the feature of the at least one door blade;

generating, by the controller, an entry path including an initial location of the delivery robot and an entry time point for entering into the revolving door and control a drive part of the delivery robot to move the delivery robot along the entry path;

controlling, by the controller, the drive part to move the delivery robot in an inner region of the revolving door based on the rotational speed of the revolving door and a movement of the door blades;

determining, by the controller, a departure point located at an exit of the revolving door based on the initial location of the delivery robot, and generating a departure path based on the departure point and the location of the delivery robot; and controlling, by the controller, the drive part to move the delivery robot along the departure path.

\* \* \* \* \*